US012411428B2

(12) United States Patent
Tanaka et al.

(10) Patent No.: US 12,411,428 B2
(45) Date of Patent: Sep. 9, 2025

(54) TONER PACK

(71) Applicant: CANON KABUSHIKI KAISHA, Tokyo (JP)

(72) Inventors: Masatake Tanaka, Kanagawa (JP); Dai Nozaki, Shizuoka (JP); Masaya Komuro, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/390,087

(22) Filed: Dec. 20, 2023

(65) Prior Publication Data

US 2024/0219852 A1 Jul. 4, 2024

(30) Foreign Application Priority Data

Dec. 28, 2022 (JP) ................................ 2022-211262

(51) Int. Cl.

| | |
|---|---|
| ***G03G 9/08*** | (2006.01) |
| ***G03G 9/087*** | (2006.01) |
| ***G03G 9/093*** | (2006.01) |
| ***G03G 15/08*** | (2006.01) |

(52) U.S. Cl.

CPC ......... *G03G 9/0825* (2013.01); *G03G 9/0827* (2013.01); *G03G 9/08711* (2013.01); *G03G 9/09342* (2013.01); *G03G 15/0874* (2013.01); *G03G 2215/0682* (2013.01)

(58) Field of Classification Search

CPC ............... G03G 9/0821; G03G 9/0825; G03G 9/0827; G03G 9/08711; G03G 9/0875; G03G 9/09342; G03G 9/09725; G03G 9/09775; G03G 15/0874; G03G 15/0891; G03G 2215/0682

See application file for complete search history.

(56) References Cited

U.S. PATENT DOCUMENTS

| | | | |
|---|---|---|---|
| 7,833,685 | B2 | 11/2010 | Tanaka |
| 8,377,616 | B2 | 2/2013 | Tani |
| 8,628,899 | B2 | 1/2014 | Kawamura |
| 8,815,484 | B2 | 8/2014 | Tanaka |
| 9,158,216 | B2 | 10/2015 | Shimano |
| 9,377,705 | B2 | 6/2016 | Shimano |
| 9,383,668 | B2 | 7/2016 | Noji |

(Continued)

FOREIGN PATENT DOCUMENTS

| | | | |
|---|---|---|---|
| EP | 4 105 728 | A1 | 12/2022 |
| JP | 6344049 | B2 | 6/2018 |

(Continued)

*Primary Examiner* — Sophia S Chen

(74) *Attorney, Agent, or Firm* — VENABLE LLP

(57) ABSTRACT

A toner pack stores a toner that has first and second toner particles. The surface of the second toner particle has a portion formed by connecting a plurality of silicon-containing protrusions on its surface, with the content of the second toner particle within a specific range relative to the content of the first toner particle. The toner pack has a storage portion and a discharge member, where the discharge member has a receiving port, a discharge port, a fixing part to which the storage portion is fixed, and an inclined surface that causes the toner to move toward the discharge port. The inclined surface that is the closest to the storage portion is at an angle of 45 degrees or more and less than 90 degrees.

9 Claims, 5 Drawing Sheets

(56) References Cited

U.S. PATENT DOCUMENTS

| | | | | |
|---|---|---|---|---|
| 9,500,972 | B2 | 11/2016 | Tanaka | |
| 9,575,424 | B2 | 2/2017 | Nakagawa | |
| 9,599,919 | B2 | 3/2017 | Isono | |
| 9,658,549 | B2 | 5/2017 | Tanaka | |
| 9,785,071 | B2 | 10/2017 | Shimano | |
| 9,829,816 | B2 | 11/2017 | Tanaka | |
| 9,835,964 | B2 | 12/2017 | Yoshida | |
| 9,880,478 | B2 | 1/2018 | Shimano | |
| 9,904,193 | B2 | 2/2018 | Nakagawa | |
| 9,958,801 | B2 | 5/2018 | Tanaka | |
| 10,054,866 | B2 | 8/2018 | Tanaka | |
| 10,845,721 | B2 | 11/2020 | Tanaka | |
| 10,942,466 | B2 | 3/2021 | Tominaga | |
| 10,976,679 | B2 | 4/2021 | Tanaka | |
| 11,003,104 | B2 | 5/2021 | Katsura | |
| 11,003,105 | B2 | 5/2021 | Sato | |
| 11,169,460 | B2 | 11/2021 | Kototani | |
| 11,249,408 | B2 | 2/2022 | Tsuda | |
| 11,829,105 | B2 | 11/2023 | Suzuki | |
| 2018/0329329 | A1 | 11/2018 | Nakamura | |
| 2020/0363768 | A1 | 11/2020 | Hashimoto | |
| 2021/0200132 | A1* | 7/2021 | Kato .................... | G03G 15/161 |
| 2021/0263446 | A1 | 8/2021 | Funatani | |
| 2021/0373450 | A1 | 12/2021 | Kawaguchi | |
| 2022/0146952 | A1 | 5/2022 | Komiya | |
| 2022/0146955 | A1 | 5/2022 | Nozaki | |
| 2022/0171301 | A1 | 6/2022 | Suzumura | |
| 2022/0365457 | A1 | 11/2022 | Unno | |
| 2022/0413414 | A1 | 12/2022 | Ozaki | |
| 2023/0015518 | A1 | 1/2023 | Nozaki | |
| 2023/0042289 | A1 | 2/2023 | Tanaka | |
| 2023/0273539 | A1 | 8/2023 | Katsura | |
| 2023/0273543 | A1 | 8/2023 | Tanaka | |
| 2023/0324829 | A1 | 10/2023 | Munetsugu | |
| 2024/0036493 | A1 | 2/2024 | Kototani | |

FOREIGN PATENT DOCUMENTS

| | | | |
|---|---|---|---|
| JP | 2020-86450 | A | 6/2020 |
| WO | 2022/124422 | A1 | 6/2022 |
| WO | 2022/131311 | A1 | 6/2022 |

* cited by examiner

TONER PACK

BACKGROUND OF THE INVENTION

Field of the Invention

The present invention relates to a toner pack.

Description of the Related Art

An electrophotographic image forming apparatus forms an image by transferring a toner image formed on the surface of a photosensitive drum using a toner as a developer onto a transfer material (recording material) as a recording medium. Such an image forming apparatus of a toner replenishment system is known (Japanese Patent Application Publication No. 2020-086450). In the image forming apparatus of a toner replenishment system, when the amount of a toner in a toner storage portion decrease, the toner in the toner storage portion of the image forming apparatus can be replenished using a container in which the toner is stored, without replacing a process member such as a photosensitive drum or a developing roller.

SUMMARY OF THE INVENTION

The image forming apparatus of a toner replenishment system uses a container in which a toner can be stored in a toner storage portion. From the viewpoint of reducing transportation costs and saving resources, there is a need to use a flexible bag in the toner storage portion of the toner storage container. Further, a toner discharge section is required to be smaller while ensuring smooth discharge performance in practical use. Hence, it has been found that there is a problem in that the internally stored toner may be prone to electrostatic aggregation, and that depending on the shape of the toner discharge section, the toner may easily remain in the toner storage container after toner replenishment.

A possible solution to the above problem is to control the charge quantity on the toner to suppress electrostatic aggregation. However, it has been found that insufficient toner charge control causes problems such as the occurrence of fogging during image formation.

The present disclosure has been made in view of the above-mentioned problems, and an object of the present disclosure is to provide a toner pack for reducing the amount of a toner remaining in a toner storage container after toner replenishment and reducing the occurrence of fogging during image formation.

The present disclosure relates to a toner pack storing a toner, wherein the toner comprises a first toner and a second toner, the first toner comprises a first toner particle and silica fine particle externally added to a surface of the first toner particle, the second toner comprises a second toner particle, on a surface of the second toner particle, there is a portion formed by connecting a plurality of protrusions comprising silicon, on the surface of the first toner particle, there is no portion formed by connecting a plurality of protrusions comprising silicon, a content of the second toner particle relative to the first toner particle in the toner pack is 0.10 to 20% by number, the toner pack has a bag-shaped storage portion configured to store the toner and having an opening, and a discharge member provided to be aligned with the storage portion in a first direction and discharging the toner from the storage portion, the first direction being a direction in which the opening opens;

the discharge member has a receiving port configured to receive the toner stored in the storage portion through the opening, and a discharge port that opens in a direction intersecting the first direction and is configured to discharge the toner received from the receiving port to outside of the toner pack;

the toner pack has a shielding member that shields the discharge port;

the receiving port is provided on a further toward inner side than the opening in a second direction perpendicular to the first direction, and opens toward the first direction;

the discharge member has a fixing part to which the opening of the storage portion is fixed, a surface extending in a direction intersecting the first direction between an outer circumferential surface of the fixing part and the receiving port, and an inclined surface to move the received toner toward the discharge port; and an inclined surface, which is closest to the storage portion in the first direction, of the inclined surface is at an angle of 45 degrees or more and less than 90 degrees with respect to the first direction.

According to one aspect of the present disclosure, it is possible to provide a toner pack in which a toner is stored in a flexible bag-shaped storage portion and which has a toner discharge section having an inclined surface, the toner pack serving to reduce the remaining amount of a toner in a toner storage container after toner replenishment and reduce the occurrence of fogging during image formation.

Further features of the present invention will become apparent from the following description of exemplary embodiments with reference to the attached drawings.

DESCRIPTION OF THE EMBODIMENTS

Figure 1A:
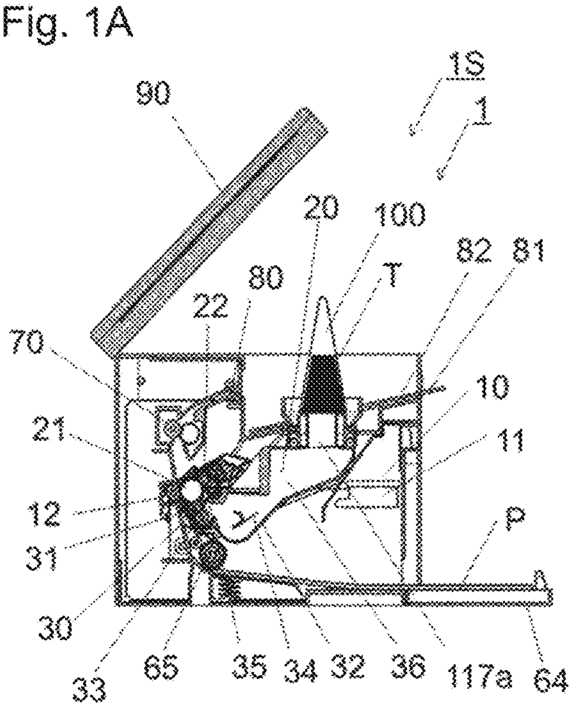
FIGS. 1A to 1C are schematic cross-sectional views of an image forming system.

Hereinafter, preferred embodiments of the present disclosure will be described in detail by way of examples with reference to the drawings. However, the dimensions, materials, shapes, relative arrangement, etc. of components described in the following examples should be changed as appropriate depending on the configuration of the apparatus to which the present disclosure is applied and various conditions. Therefore, unless there is a specific description, these are not intended to limit the scope of the present invention.

In the present disclosure, the expression of "from XX to YY" or "XX to YY" indicating a numerical range means a numerical range including a lower limit and an upper limit which are end points, unless otherwise specified.

Also, when a numerical range is described in a stepwise manner, the upper and lower limits of each numerical range can be arbitrarily combined.

Hereinafter, a toner storage space V is a space that is a combination of the space inside a storage portion 101 and a space inside a flow path 102*k*.

Hereinafter, the direction in which an opening 101*c* of the storage portion 101 opens is taken as a first direction X. Further, a direction perpendicular to the first direction X is taken as a second direction Y. For example, the second direction Y may coincide with the direction in which a discharge port 102*a* opens toward the outside of a nozzle 102. In this case, the third direction Z is a direction orthogonal to the first direction X and the second direction Y. Further, unless otherwise specified, the "upper side" and the "lower side" in the first direction X refer to the upper side and lower side in the gravity direction (vertical direction) when the nozzle 102 (direction in which the opening 101*c* opens) is facing downward in order to mount a toner pack 100 on a mounting portion 106 of an image forming apparatus 1.

Image Forming Apparatus

Figure 1B:
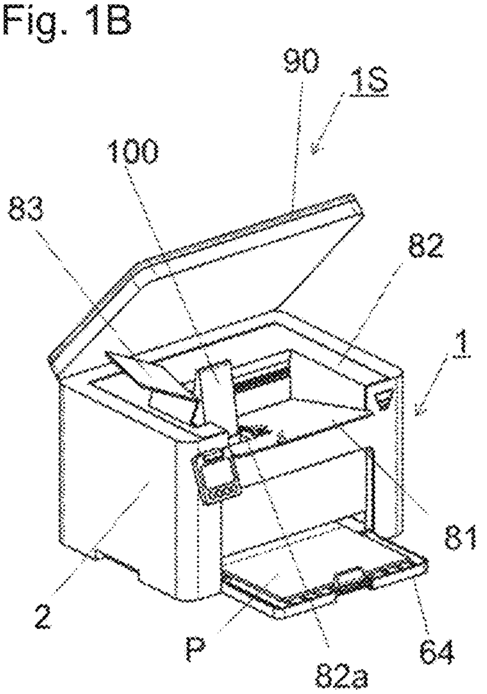
Figure 1C:
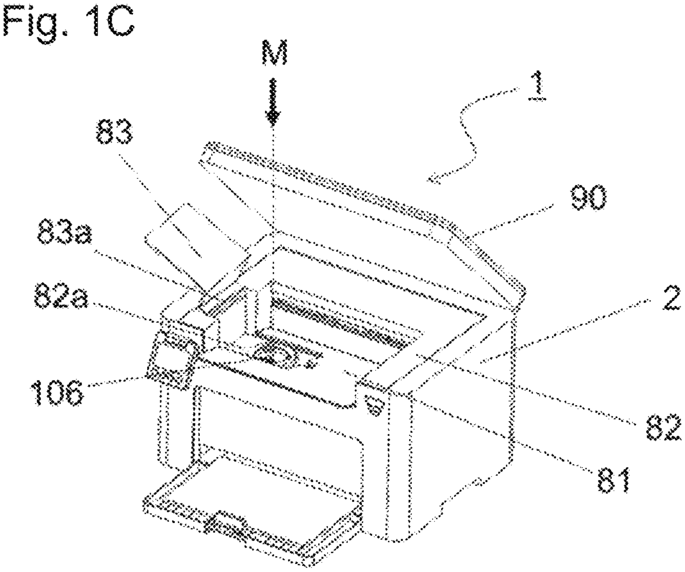

The image forming apparatus 1 in which the toner pack of the present invention is used will be overviewed hereinbelow. FIG. 1A is a schematic cross-sectional view of an image forming system 1S including the image forming apparatus 1. FIG. 1B is a perspective view showing the configuration of the image forming system 1S including the image forming apparatus 1. FIG. 1C is a perspective view taken in a different direction from FIG. 1B and showing the configuration of the image forming apparatus 1 without the toner pack 100 mounted thereon.

Although a process cartridge type electrophotographic image forming apparatus of a toner replenishment system will be described as an example herein, the toner pack according to the present disclosure can be applied to various image forming apparatuses that are not limited to such image forming apparatus. For example, the toner pack according to the present disclosure can be applied to a toner pack used in an image forming apparatus in which a cartridge is removed and refilled.

The image forming system 1S includes the image forming apparatus 1 and the toner pack 100 mounted on the image forming apparatus 1. The image forming apparatus 1 includes an apparatus main body 2 and a process cartridge 20 that is removably attachable to the apparatus main body 2. The apparatus main body 2 includes an image forming unit 10 that forms a toner image on a recording material P, a pickup roller 65 that feeds the recording material P from a tray 64 to the image forming unit 10, a fixing unit 70 that fixed the toner image formed by the image forming unit 10 to the recording material P, and a pair of discharge rollers 80.

The image forming unit 10 comprises a scanner unit 11, an electrophotographic process cartridge 20, and a transfer roller 12 that transfers the toner image as a developer image formed on a photosensitive drum 21 of the process cartridge 20 onto the recording material P. The process cartridge 20 comprises the photosensitive drum 21, a charging roller 22 arranged around the photosensitive drum 21, and a developing device 30.

The developing device 30 comprises a developing roller 31 as a developer carrier that carries a developer, a developer container 32 serving as a frame of the developing device 30, and a supply roller 33 capable of supplying the developer to the developing roller 31. The developer container 32 is provided with a toner storage chamber 36 where the toner is stored, an agitation member 34 as a stirring means disposed inside the toner storage chamber 36, and a development blade 35. The developing device 30 is provided with a cartridge opening 117*a* for receiving a nozzle 102 of the toner pack 100. The cartridge opening 117*a* is preferably closed with a cap or the like except when the toner is being replenished.

Figure 2A:
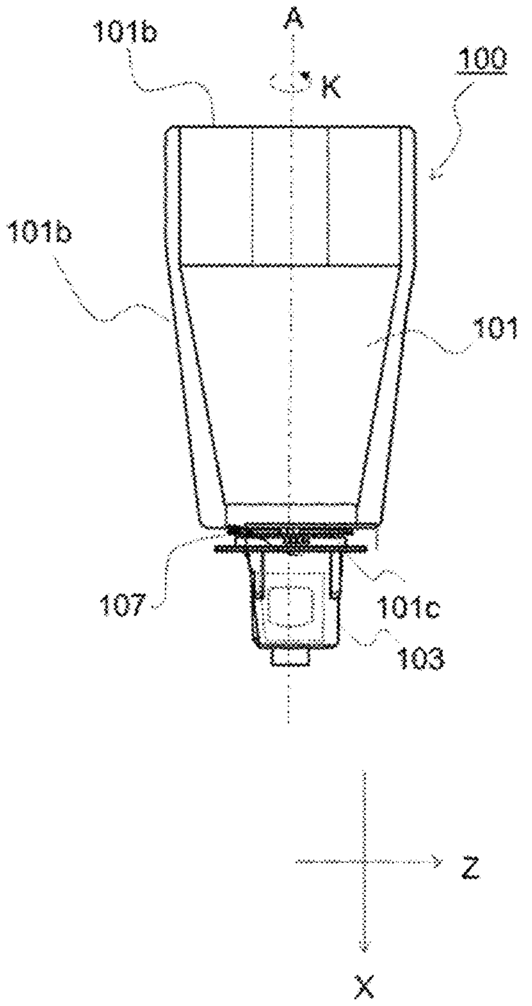
FIGS. 2A and 2B are schematic diagrams of a toner pack.
Figure 2B:
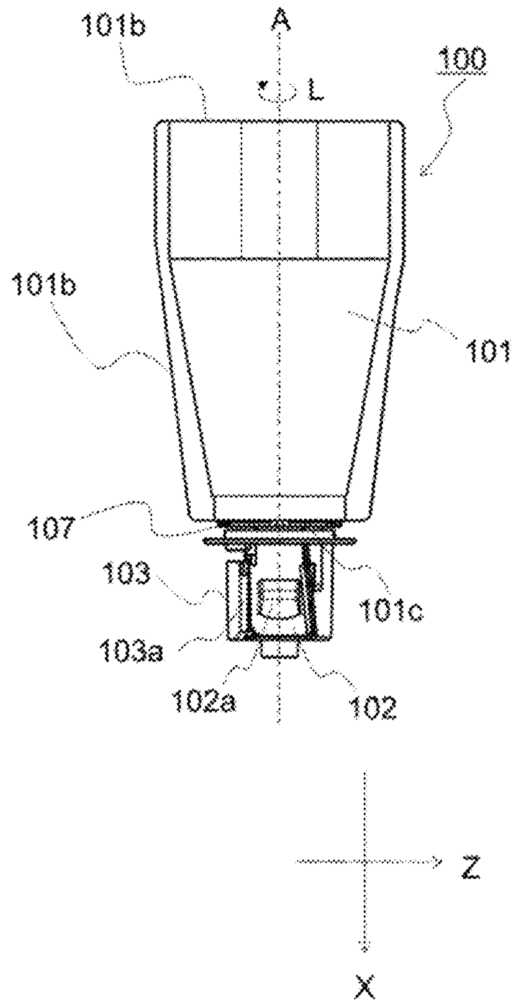
Figure 3:
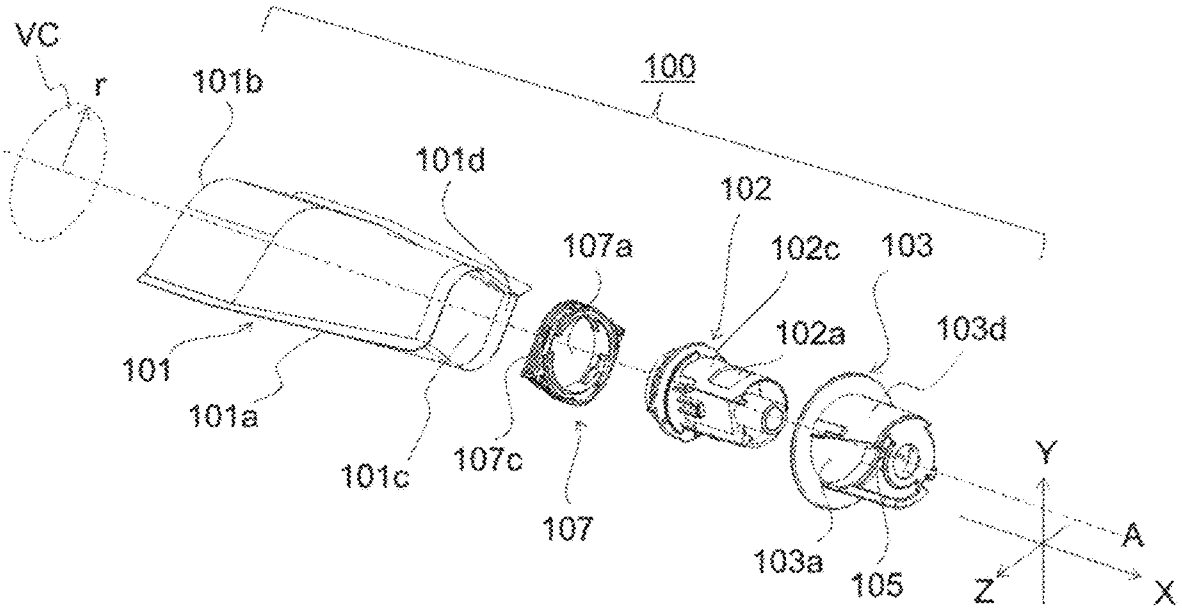
FIG. 3 is an exploded perspective view showing the structure of the toner pack.

A top cover 82 as a loading tray is provided on the upper part of the apparatus main body 2, and a discharge tray 81 as a loading surface is formed on the upper surface of the top cover 82. An opening/closing member 83 is supported by the top cover 82 so as to be rotatable about a rotation shaft 83*a*. The opening/closing member 83 is movable by rotation between an open state in which an opening 82*a* is exposed and a closed state in which the opening 82*a* is closed. The open state is shown in FIGS. 2A and 2B and FIG. 3. The discharge tray 81 of the top cover 82 is formed with the opening 82*a* that opens upward.

When replenishing the toner, a user inserts the toner pack 100 in a mounting direction M (indicated by an arrow in FIG. 1C) so that the nozzle 102 of the toner pack 100 overlaps the mounting portion 106. Then, the nozzle 102 is inserted into the toner storage chamber 36 through the opening 82*a* of the apparatus main body 2 and the cartridge opening 117*a* of the developing device 30. As a result, as shown in FIG. 1A, the toner T inside the toner pack 100 moves to the toner storage chamber 36 under gravity.

A reading device 90 for reading a document is provided on the top of the top cover 82. The reading device 90 is provided to be rotatable between a state in which it covers the top cover and a state in which it does not cover the top cover as shown in FIG. 1A.

FIGS. 1A to 1C illustrate a system in which the user replenishes the toner from a toner pack 100 filled with replenishing toner to the developing device 30 while the developing device 30 is mounted on the image forming apparatus 1 (direct replenishment system). Therefore, when the remaining amount of toner in the process cartridge 20 becomes low, there is no need to remove the process cartridge 20 from the apparatus main body 2 and replace it with a new process cartridge. Thus, usability is improved. Furthermore, it is possible to replenish the toner in the developing device 30 at a lower cost than when replacing the entire process cartridge 20. The direct replenishment system does not require replacement of various rollers, gears, etc., and can therefore reduce costs compared to the case where only the developing device 30 of the process cartridge 20 is replaced. However, the present disclosure is not limited to direct replenishment system.

Toner Pack

Next, the configuration of the toner pack 100 will be described using FIGS. 2A and 2B, FIG. 3, and FIGS. 4A to 4D. FIGS. 2A and 2B are a front view and a schematic cross-sectional view of a toner pack as a toner storage container. FIG. 3 is an exploded perspective view showing the internal structure of the toner pack 100.

The toner pack 100 is configured to store toner, is removably attachable to the image forming apparatus 1, and replenishes the toner in the image forming apparatus 1. For example, the toner can be replenished into the toner storage chamber of the image forming apparatus.

The toner pack 100 has a bag-shaped storage portion 101 having an opening 101*c*.

The toner pack 100 has a discharge member that is provided to be aligned with the storage portion 101 in the first direction when the direction in which the opening 101*c* opens is taken as the first direction. The discharge member may comprise a connecting portion 107 and a nozzle 102. The connecting portion 107 and the nozzle 102 of the discharge member may be integrated. Furthermore, the discharge member may be configured integrally with the storage portion 101.

Further, the toner pack 100 comprises a shielding member 103 that shields the discharge port 102*a* of the discharge member.

The toner pack 100 comprises the storage portion 101 where the toner is stored, the nozzle 102 as a communication member, the connecting portion 107 that connects the storage portion 101 and the nozzle 102, and the shielding member 103. The storage portion 101 is provided on the first end side in the first direction X, and the nozzle 102, connecting portion 107, and shielding member 103 are provided on the second end side opposite to the first end in the first direction X. The first direction X is the direction of the axis A of the substantially cylindrical nozzle 102 and the connecting portion 107 and is also the direction of the rotation axis of the shielding member 103 that rotates with respect to the nozzle 102.

The storage portion 101 is a bag-shaped part that comprises a side surface portion 101*a* extending in the first direction X while forming a space (storage space) for storing the toner, and a bottom surface portion 101*b* that closes the first end side of the storage space in the first direction X. The second end side of the storage space in the first direction X is the opening 101*c*. The storage portion also has a bag-shaped inner circumferential surface 101*d*. The storage portion 101 is formed of a flexible material that can be easily deformed by the user's hands. The storage portion 101 of this embodiment is a pouch with a thickness of approximately 115 μm formed by pouch processing using a flexible polypropylene sheet.

The storage portion 101 has a tapered shape with a width that becomes narrower from the first end side toward the second end side (nozzle side) in the first direction X. The storage portion 101 is not limited to a pouch and may be a deformable bottle made of resin, or a container made of paper, vinyl, or the like.

The connecting portion 107 has an outer circumferential surface 107*c* extending in the first direction X, and a receiving port 107*a* that opens in a direction intersecting the first direction X from the upper end of the outer circumferential surface 107*c* in the first direction X. The inner circumferential surface 101*d* of the storage portion 101 and the outer circumferential surface 107*c* of the connecting portion 107 are connected so as to close the opening 101*c* of the storage portion 101 (FIG. 3). In other words, the connecting portion 107 functions as a fixing portion to which the opening 101*c* of the bag-shaped storage portion 101 is fixed. Further, the discharge member has the fixing portion 107 and a surface 107*p* extending in a direction intersecting the first direction between the outer circumferential surface 107*c* of the fixing portion 107 and the receiving port 107*a*. The toner stored in the storage portion 101 is supplied through the opening of the connecting portion 107.

The discharge member is provided to be aligned with the bag-shaped storage portion in the first direction and discharges the toner from the storage portion. The discharge member has the receiving port 107*a* of the connecting portion 107 that is configured to receive the toner stored in the storage portion 101 through the opening 101*c*, and a toner receiving portion 102*e* that is substantially on the same plane as the receiving port 107*a*. The discharge member has the discharge port 102*a* configured to discharge the toner received from the receiving port 107*a* to the outside of the toner pack 100, and a flow path 102*k* that communicates the toner receiving portion 102*e* with the discharge port 102*a*.

In other words, the nozzle 102 functions as a communication section constituting a flow path (path, passage) that communicates the inside and outside of the toner pack 100. That is, the toner pack has a toner flow path communicating from the opening to the discharge port 102*a* through the receiving port 107*a* in the discharge member.

The discharge port 102*a* is open in a direction intersecting the first direction. The discharge port 102*a* preferably opens in the second direction Y, which is a direction perpendicular to the first direction X. Although the direction in which the discharge port 102*a* opens is not particularly limited, the angle between the first direction and the direction in which the discharge port 102*a* opens is preferably 45° to 95°, more preferably 60° to 90°.

The toner stored in the storage portion 101 (inside the storage space) can be discharged to the outside of the toner pack 100 through the toner receiving portion 102*e*, the receiving port 107*a*, the flow path 102*k*, and the discharge port 102*a*. The receiving port 107*a* is provided on the inside with respect to the opening 101*c* in the second direction Y that is perpendicular to the first direction X, and opens toward the first direction X. That is, the diameter of the receiving port 107*a* is smaller than the diameter of the opening 101*c*.

The shielding member 103 that shields the discharge port 102*a* is provided on the outside of the side surface 102*c* of the nozzle 102. The shielding member 103 is attached to the nozzle 102 to be rotatable around the axis A extending in a direction along the first direction X. The shielding member 103 has a side surface 103*d* extending in an arc shape centered on the axis A outside the side surface 102*c* of the nozzle 102 when viewed in the first direction X. An opening 103*a* is provided in the side surface 103*d*, as shown in FIG. 2B. The shielding member 103 is provided outside the side surface 102*c* in the radial direction r of a virtual circle VC centered on the axis A. The side surface 102*c* of the nozzle 102 is a curved surface that is convex toward the outside in the radial direction r of the virtual circle VC centered on the axis A. The inner surface of the shielding member 103 (the surface facing the side surface 102*c* of the nozzle 102) is a curved surface (an arcuate surface when viewed in the first direction X) along the side surface 102*c* of the nozzle 102.

A substantially rectangular seal 105 is attached to the inner surface of the shielding member 103. As shown in FIGS. 2A and 2B, the shielding member 103 is configured to be rotatable about the axis A between two positions: a closed position (first position) where the seal 105 for preventing toner leakage closes the discharge port 102*a* of the nozzle 102, and an open position (second position) where the discharge port 102*a* is open. When the shielding member 103 is in the open position, the discharge port 102*a* of the nozzle 102 is exposed from the opening 103*a*. FIG. 2A shows the shielding member 103 in the closed position, and FIG. 2B shows the shielding member 103 in the open position. Where the shielding member 103 in the closed position shown in FIG. 2A is rotated about the axis A in the direction of arrow K (first rotation direction), it reaches the open position shown in FIG. 2B. Conversely, where the shielding member 103 is rotated from the open position in the direction of arrow L (second rotation direction), it reaches the closed position.

The discharge member has an inclined surface (plane or curved surface) (102*g*3 in FIG. 4C) that is inclined with respect to the first direction X at an angle of 45 degrees or more and less than 90 degrees. The inclined surface is for causing the toner received from the receiving port 107*a* to flow toward the discharge port 102*a*. For example, when the opening 101*c* is oriented downward in the direction of gravity, the toner flows from the receiving port to the discharge port and is discharged from the toner pack.

From the viewpoint of discharge performance (discharging toner without clogging), the inclined surface (102*g*3 in FIG. 4C) of the aforementioned inclined surface that is the closest to the storage portion in the first direction is at an angle of 45 degrees or more with respect to the first direction X.

The angle of the inclined surface closest to the storage portion with respect to the first direction X is preferably 46 degrees or more, more preferably 47 degrees or more, and even more preferably 48 degrees or more. Further, the angle is preferably 80 degrees or less, more preferably 70 degrees or more, and even more preferably 60 degrees or less. For example, preferred ranges include 46 to 80 degrees, 47 to 70 degrees, and 48 to 60 degrees.

Figure 4A:
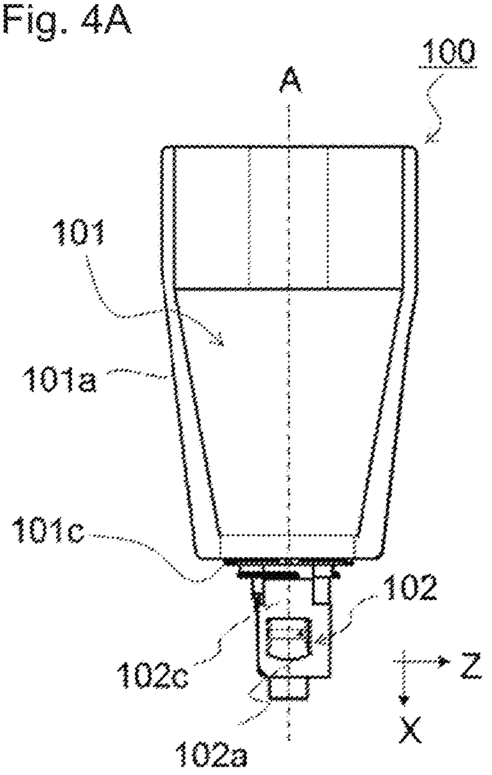
FIGS. 4A to 4D are schematic diagrams of a discharge member of the toner pack.
Figure 4B:
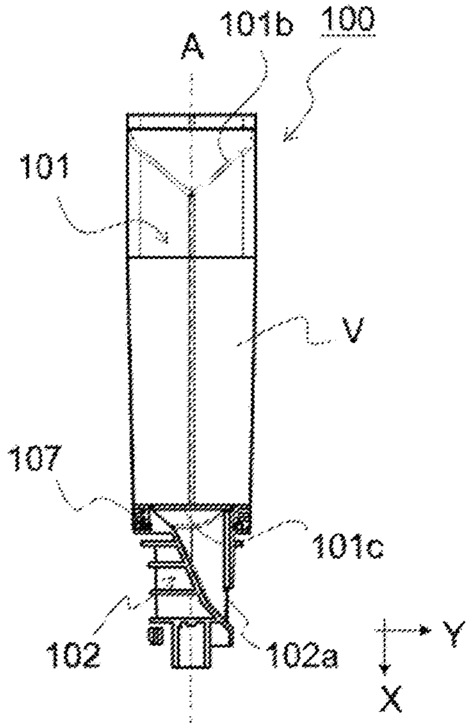
Figure 4C:
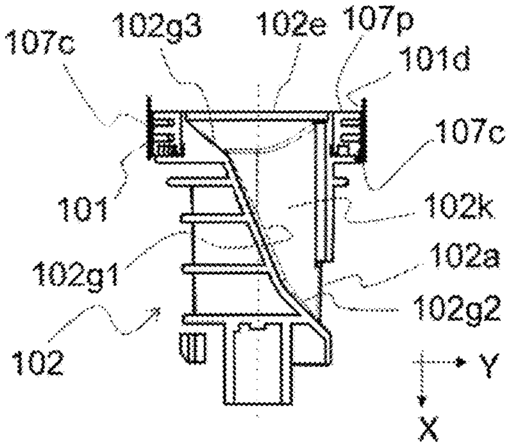
Figure 4D:
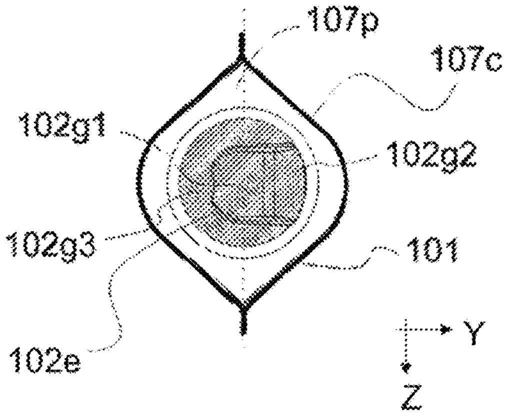

The angle of the inclined surface with respect to the first direction X may be changed toward the first direction. For example, as shown in FIG. 4C, there may be the inclined surface 102*g*3 with an angle of 45 degrees or more and less than 90 degrees, an inclined surface 102*g*1 with an angle of 20 degrees to 40 degrees, and an inclined surface 102*g*2 with an angle of 40 degrees to 70 degrees.

Meanwhile, there were cases where toner was likely to remain on an inclined surface of 45 degrees or more after the toner was discharged. As a result of intensive studies, the inventors of the present invention have solved this problem by using the following toner.

Toner Contained in Toner Pack

The toner used in the present disclosure, that is, the toner to be stored in the toner pack 100, will be described hereinbelow. In the present disclosure, the toner comprises a first toner and a second toner.

The first toner has a first toner particle and fine silica particles externally added to the surface of the first toner particle. The second toner has a second toner particle, and a portion formed by connecting a plurality of protrusions comprising silicon is present on the surface of the second toner particle.

A portion formed by connecting a plurality of protrusions comprising silicon on the surface of the toner particle may be formed, for example, by a method of forming a surface layer comprising an organosilicon polymer on the surface of the toner particle. That is, the portion formed by connecting a plurality of protrusions comprising silicon is preferably a surface layer comprising an organosilicon polymer on the surface of the toner particle. For example, the organosilicon polymer is a condensation product of organosilicon compounds. In the process of forming an organosilicon polymer, which will be described hereinbelow, the connection of the plurality of protrusions can be controlled by changing the type and amount of monomers, reaction temperature, pH, etc.

Meanwhile, on the surface of the first toner particle, there is no portion formed by connecting a plurality of protrusions comprising silicon. In other words, where silica fine particles are fixedly attached to a toner particle by a known general external addition processing without intentionally performing the processing to connect a plurality of protrusions, there is no portion formed by connecting a plurality of protrusions comprising silicon.

The content of the second toner particles relative to the first toner particles in the toner pack is 0.10% to 20% by number.

By comprising the second toner particle, overcharging of the first toner particle can be suppressed. By setting the content of the second toner particles to the first toner particles in the toner pack to be 0.10% or more by number, overcharging of the first toner is efficiently alleviated and electrostatic aggregation can be suppressed. As a result, the remaining amount of toner in the toner storage container after toner replenishment can be reduced.

However, if the content of the second toner particles relative to the first toner particles is too large, the charge quantity of the first toner particle will decrease excessively. It has been found that, as a result, fogging caused by the development of low-charge toner in non-image areas is likely to occur during image formation.

In order to solve the above problem, the charge quantity of the toner can be adequately controlled and the occurrence of fogging during image formation can be reduced by setting the content of the second toner particles to the first toner particles in the toner pack to 20% or less by number.

The content of the second toner particles relative to the first toner particles in the toner pack is preferably 1% or more by number, more preferably 2% or more by number, and even more preferably 3% or more by number. Moreover, it is preferably 15% or less by number, more preferably 13% or less by number, and even more preferably 10% or less by number. For example, the preferable range is a range of 1 to 15% by number, 2 to 13% by number, and 3 to 10% by number.

As mentioned above, one possible reason why toner tends to remain on the inclined surface of the discharge member during replenishment is that it becomes difficult for the toner to slide down the inclined surface due to electrostatic aggregation caused by local overcharging of the toner. Generally, when replenishing, the pack is shaken to introduce air and improve the toner discharge performance, but at this time, the toner becomes electrically charged due to contact and separation between the toner particles and between the toner and the inner wall of the pack. At this time, the charge quantity may be uneven within the toner particles or between the toner particles, and electrostatic aggregation may occur easily.

The second toner has a portion formed by connecting a plurality of protrusions comprising silicon. It is considered that when the first toner and the second toner come into contact, overcharging of the first toner is efficiently alleviated through the connection portions of the second toner, and electrostatic aggregation is suppressed, thereby reducing the remaining amount of toner at the inclined portion of the toner pack after toner replenishment.

The first toner preferably has fluorine-comprising hydrotalcite particles externally added to the surface of the first toner particles. Fluorine-comprising hydrotalcite particles have been conventionally used to enhance charging performance and improve developing performance of the toner in the development process, and seem to be unfavorable from the viewpoint of reducing the remaining amount of toner in toner packs after toner replenishment, which is due to electrostatic aggregation. However, in the presence of the second toner, the same or higher effect of reducing the remaining amount of toner is exhibited regardless of the presence or absence of fluorine-comprising hydrotalcite particles. Therefore, from the viewpoint of achieving both the improvement of the developing performance and the reduction in the remaining amount of toner after toner replenishment, it is preferable to have fluorine-comprising hydrotalcite particles. This is thought to be due to the synergistic effect of the enhancement of charging performance by the fluorine-comprising hydrotalcite particles and the efficient alleviation of overcharging by the connection portions of the second toner, this effect acting to generate repulsion rather than aggregation within or between toner particles. The content of the fluorine-comprising hydrotalcite particles is preferably 0.01 to 0.5 parts by mass based on 100 parts by mass of the toner particles.

The first toner preferably has needle-shaped titania particles externally added to the surface of the first toner particle. Generally, titania particles have low resistance, and needle-shaped ones, in particular, have a high charge leakage property. It is thought that in the presence of the second toner, the presence of needle-shaped titania particles improves uniformity of overcharging leakage property, leading to a reduction in the remaining amount of toner in the toner storage portion after toner replenishment.

Needle-shaped titania refers to titanium oxide fine particles with a high aspect ratio. Specifically, the long axis (maximum diameter) is from 100 to 3000 nm, preferably from 500 to 2000 nm, and more preferably from 800 to 1700 nm. Further, the aspect ratio is 5.0 or more, preferably 6.0 or more, and more preferably 8.0 or more.

The content of the needle-shaped titania particles is preferably 0.01 to 0.5 parts by mass based on 100 parts by mass of toner particles.

From the viewpoint of ease of manufacture, the shape factor SF-1 of the first toner is preferably from 110 to 150, more preferably from 125 to 140. The larger SF-1 is, the lower the toner flowability is, and the remaining amount of toner in the toner storage container after toner replenishment tends to increase. However, in the presence of the second toner of the present disclosure, a good effect of reducing the remaining amount of toner can also be obtained within the above SF-1 range.

Controlling the SF-1 of the first toner within the above range is achieved by producing the toner using a known pulverization method and emulsion aggregation method. Furthermore, SF-1 can be reduced by applying a known sphering process.

As mentioned above, the first toner can be produced using a known pulverization method and emulsion aggregation method. Further, a known sphering process may be applied as necessary. Below, a method for producing toner using a pulverization method and an emulsion aggregation method will be described.

Method for Producing Toner Using Pulverization Method

Raw Material Mixing Step

In the raw material mixing step, predetermined amounts of materials constituting the toner particles, such as a binder resin and wax, and optionally other components such as a colorant and a charge control agent, are weighed, blended, and mixed. As the binder resin, two or more resins having different molecular weights may be used in combination. Examples of the mixing device include a double cone mixer, a V-type mixer, a drum-type mixer, a Super mixer, a Henschel mixer, a Nauta mixer, a MechanoHybrid (manufactured by Nippon Coke Industry Co., Ltd.), and the like.

Melt-Kneading Step

Next, the mixed materials are melted and kneaded to disperse wax and the like in the binder resin. In the melt-kneading process, batch-type kneaders such as pressure kneaders and Banbury mixers, as well as continuous-type kneaders can be used, and single-screw or twin-screw extruders have become mainstream due to their advantage in continuous production. Suitable examples include KTK type twin screw extruder (manufactured by Kobe Steel, Ltd.), TEM type twin screw extruder (manufactured by Toshiba Machinery Co., Ltd.), PCM kneader (manufactured by Ikegai Co., Ltd.), a twin screw extruder (manufactured by K.C.K. Co., Ltd.), Co-kneader (manufactured by Buss AG), and Kneedex (manufactured by Nippon Coke Industry Co., Ltd.). Furthermore, the resin composition obtained by melt-kneading may be rolled with two rolls or the like and may be cooled with water or the like in a cooling step.

In the melt-kneading step, it is preferable to melt-knead using a twin-screw extruder. The dispersion state of a crystalline resin and an amorphous resin, the number-average diameter of domains, and the like can be controlled by adjusting the kneading temperature, screw rotation speed, and the like in the melt-kneading step.

The kneading temperature is preferably 110 to 140° C., more preferably 115 to 130° C. The screw rotation speed during kneading is not particularly limited as long as it can be changed as appropriate depending on the equipment, but is preferably 1000 to 1500 rpm, for example.

Cooling Step

The means for the cooling step is not particularly limited. A method in which a kneaded product of the resin composition is rolled with two-axis rollers or drums and then cooled with a steel belt cooler (manufactured by Nippon Steel Conveyor Co., Ltd.), or a method in which rolling is performed, while cooling, with a press roller and a drum equipped with an internal cooling mechanism, such as a belt drum flaker (manufactured by Nippon Coke Co., Ltd.), can be mentioned. In the cooling step, rolling while cooling with a belt drum flaker is preferable.

Pulverization Step

Next, the cooled resin composition is pulverized to a desired particle size in a pulverization step. In the pulverization step, after coarse pulverization is performed using a pulverizer such as a crusher, hammer mill, or feather mill, fine pulverization is performed with a Kryptron system (manufactured by Kawasaki Heavy Industries, Ltd.), Super Rotor (manufactured by Nissin Engineering Co., Ltd.), Turbo Mill (manufactured by Turbo Industries) or a fine pulverizer based on an air jet system.

Classification Step

After that, if necessary, classification is performed using inertial classification type Elbow Jet (manufactured by Nippon Steel Mining Co., Ltd.), centrifugal force classification type Turboplex (manufactured by Hosokawa Micron Corporation), a TSP separator (manufactured by Hosokawa Micron Corporation), Faculty (manufactured by Hosokawa Micron Corporation), a multi-division classifier using a Coanda effect, a wind classifier, or a sieve classifier to obtain toner particles.

External Addition Step

A toner is obtained by externally adding silica fine particles as an external additive to the surface of toner particles. Further, other external additives may be added in addition to the silica fine particles, if necessary.

A method for externally adding external additives can be exemplified by a method of blending the classified toner and various known external additives in predetermined amounts, and stirring and mixing by using a mixing device such as a double cone mixer, a V-type mixer, a drum-type mixer, Super Mixer, a Henschel mixer, Nauta mixer, MechanoHybrid (manufactured by Nippon Coke Industry Co., Ltd.), and the like as an external addition device.

Other external additives include, for example, hydrotalcite particles, charging aids, conductivity imparting agents, flowability imparting agents, anti-caking agents, release agents for hot roller fixing, lubricants, and the like. It is preferable that the hydrotalcite particles comprise fluorine. Fluorine-comprising hydrotalcite particles can be those produced by a known method.

The external additive mixing time when externally adding the external additive to the toner particle is preferably 3 to 20 min. Further, the amount of silica fine particles added is preferably 0.1 to 5.0 parts by mass based on 100.0 parts by mass of toner particles.

Method for Producing Toner by Emulsion Aggregation Method

When producing a toner by the emulsion aggregation method, the following method can be used.

Dispersion Step

In the dispersion step, a fine particle dispersion liquid consisting of the constituent materials of the toner particles is prepared.

Resin Particle Dispersion Liquid

The resin particle dispersion liquid can be prepared by known methods but is not limited to these methods. Examples of known methods include an emulsion polymerization method, a self-emulsification method, a phase inversion emulsification method in which a resin is emulsified by adding an aqueous medium to a resin solution obtained by dissolving in an organic solvent, and a forced emulsification method in which a resin is forcibly emulsified by treatment at high temperature in an aqueous medium without using an organic solvent. A specific example is shown below, but this method is not limiting.

A binder resin is dissolved in a solvent that can dissolve it, and a surfactant and a basic compound are added. At this time, where the binder resin is a crystalline resin having a melting point, the dissolution is performed by heating to or above the melting point. Subsequently, while stirring, an aqueous medium is gradually added to perform emulsion polymerization and resin particles are precipitated. Thereafter, ion-exchanged water or the like is added to prepare a resin particle dispersion liquid having a specific solid fraction concentration.

The surfactant is not particularly limited, and examples thereof include anionic surfactants such as sulfuric acid esters and salts, sulfonic acid salts, carboxylic acid salts, phosphoric acid esters, soaps, and the like; cationic surfactants such as amine salts, quaternary ammonium salts, and the like; nonionic surfactants such as polyethylene glycol type, alkylphenol ethylene oxide adduct type, polyhydric alcohol type, and the like, etc. Commercially available products include Neogen RK (manufactured by Daiichi Kogyo Seiyaku Co., Ltd.). One type of surfactant may be used alone, or two or more types may be used in combination.

Basic compounds include but are not particularly limited to inorganic bases such as potassium persulfate, sodium hydroxide, potassium hydroxide, and the like, and organic bases such as ammonia, triethylamine, trimethylamine, dimethylaminoethanol, diethylaminoethanol, and the like. The basic compounds may be used alone or in combination of two or more.

The solid fraction concentration in the resin particle dispersion liquid is not particularly limited, but it is preferably 5.0 to 15.0% by mass based on the total mass of the resin particle dispersion liquid.

Furthermore, the volume-based median diameter of the resin particles in the resin particle dispersion liquid is preferably 0.10 to 0.50 μm. The volume-based median diameter of the resin particles can be measured with a laser diffraction particle size distribution analyzer (manufactured by Horiba, Ltd., LA-920). Settings for measurement conditions and analysis of measured data are carried out using dedicated software for the LA-920 apparatus (HORIBA LA-920 for Windows (registered trademark) WET (LA-920) Ver. 2.02). In addition, ion exchanged water from which solid impurities and the like have been removed in advance is used as a measurement solvent. The measurement procedure is as follows.

(1) A Batch Type Cell Holder is Attached to the LA-920.

(2) A prescribed amount of ion exchanged water is placed in a batch type cell, and the batch type cell is set on the batch type cell holder.

(3) The contents of the batch type cell are stirred using a dedicated stirrer chip.

(4) The "Refractive Index" button on the "Display Condition Setting" screen is pressed and the relative refractive index is set to a value corresponding to the resin particles.

(5) Particle diameter basis is set to volume-based on the "Display condition setting" screen.

(6) After warming up for 1 hour or more, the optical axis is adjusted and then microadjusted, and blank measurements are carried out.

(7) A total of 3 ml of the resin particle dispersion liquid is placed into a 100.0 ml glass flat-bottomed beaker. Further, 57 ml of ion-exchanged water is added to dilute the resin particle dispersion liquid. To this, 0.3 ml of a diluted solution obtained by three-fold-mass dilution of "Contaminon N" (a 10% by mass aqueous solution of a neutral detergent for cleaning precision measuring instruments with a pH of 7 consisting of a nonionic surfactant, an anionic surfactant, and an organic builder, manufactured by Wako Pure Chemical Industries, Ltd.) with ion-exchanged water is added as a dispersant.

(8) An ultrasonic wave disperser "Ultrasonic Dispersion System Tetra 150 (produced by Nikkaki Bios Co., Ltd.)" having an electrical output of 120 W, in which two oscillators having an oscillation frequency of 500 kHz are housed so that their phases are staggered by 180° is prepared. 3.3 L of ion exchanged water is placed in a water bath in the ultrasonic dispersion system, and 2 mL of Contaminon N is added to this water bath.

(9) The beaker mentioned in step (7) above is placed in a beaker-fixing hole in the ultrasonic wave disperser, and the ultrasonic wave disperser is activated. The height of the beaker is adjusted so that the resonant state of the liquid surface of the aqueous solution in the beaker is at a maximum.

(10) The ultrasonic dispersion treatment is continued for 60 sec. Further, in the ultrasonic dispersion, the water temperature in the water tank is adjusted, as appropriate, to be from 10° ° C. to 40° C.

(11) The resin particle dispersion liquid prepared in (10) is immediately added little by little to a batch type cell while being careful not to introduce air bubbles, and adjustment is performed so that the transmittance of the tungsten lamp becomes 90% to 95%. Then, the particle size distribution of the resin particles is measured. The median diameter is calculated based on the obtained volume-based particle size distribution data.

Release Agent Dispersion Liquid

If necessary, a release agent dispersion liquid may be used. A release agent dispersion liquid can be prepared by a known method. For example, it can be prepared by the following method, but this method is not limiting.

The release agent dispersion liquid can be prepared by adding the release agent to an aqueous medium comprising a surfactant, heating to or above the melting point of the release agent, and dispersing with a wet jet mill (for example, JN100 (manufactured by Joko Co., Ltd.)). The wax concentration of the release agent dispersion liquid is not particularly limited but is preferably 5.0 to 50.0% by mass based on the total mass of the release agent dispersion liquid.

Colorant Fine Particle Dispersion Liquid

If necessary, a colorant fine particle dispersion liquid may be added. The colorant fine particle dispersion liquid can be prepared by a known method. For example, it can be prepared by the following method, but this method is not limiting.

A colorant, an aqueous medium, and a dispersing agent are mixed using a known mixer such as an agitator, an emulsifier, and a disperser. As the dispersing agent used here, known ones such as surfactants and polymer dispersing agents can be used. Both surfactants and polymeric dispersing agents can be removed in the washing step described below, but from the viewpoint of washing efficiency, surfactants are preferred. Examples of commercially available products include Neogen RK (manufactured by Daiichi Kogyo Seiyaku Co., Ltd.) and the like. One type of surfactant may be used alone, or two or more types may be used in combination.

The concentration of the surfactant in the aqueous medium is preferably 0.01 to 1% by mass. The solid fraction concentration in the colorant fine particle dispersion liquid is not particularly limited, but it is preferably 1 to 30% by mass based on the total mass of the colorant fine particle dispersion liquid.

Examples of known mixers such as stirrers, emulsifiers, and dispersers used to disperse colorants in aqueous media include ultrasonic homogenizers, jet mills, pressure homogenizers, colloid mills, ball mills, sand mills, and paint shakers. These may be used alone or in combination.

Mixing Step

In the mixing step, a liquid mixture is prepared by mixing the resin particle dispersion liquid and, if necessary, at least one of a release agent dispersion liquid and a colorant dispersion liquid. This can be carried out using known mixing devices such as homogenizers and mixers.

Aggregated Particle Generation Step (Aggregation Step)

In the aggregation step, the fine particles contained in the liquid mixture prepared in the mixing step are aggregated to form aggregates with a desired particle size. At this time, aggregated particles in which the resin particles and, if necessary, the release agent and/or the colorant were aggregated are generated to form a core by adding and mixing a flocculant and applying, as appropriate and necessary, heating and/or mechanical power.

Examples of flocculants include organic flocculants such as quaternary salt cationic surfactants, polyethyleneimine, and the like; inorganic metal salts such as sodium sulfate, sodium nitrate, sodium chloride, calcium chloride, aluminum chloride, calcium nitrate, and the like; inorganic ammonium salts such as ammonium sulfate, ammonium chloride, ammonium nitrate, and the like; and inorganic flocculants such as metal complexes with a valence of 2 or more and the like.

The flocculant may be added in the form of either a dry powder or an aqueous solution obtained by dissolution in an aqueous medium. In order to cause uniform aggregation, it is preferable to add the flocculant in the form of an aqueous solution.

The addition and mixing of the flocculant are preferably performed at a temperature equal to or lower than the glass transition temperature or melting point of the resin comprised in the liquid mixture. By mixing under such temperature condition, aggregation progresses relatively uniformly. The flocculant can be mixed into the liquid mixture using a known mixing device such as a homogenizer or a mixer. The aggregation step is a step of forming an aggregated particle (core) of a toner particle size in an aqueous medium. The volume-based median diameter of the aggregated particles produced in the aggregation step is preferably 3 to 10 μm. The volume-based median diameter of the aggregated particles can be measured by the toner particle diameter measuring method described below.

Shell Formation Step

A shell formation step may be performed after the aggregation step. In the shell formation step, resin particles are newly added and attached to the particle (also referred to as core particle) produced in the previous steps to form a shell. A resin particle dispersion liquid is further added to the dispersion liquid after the aggregation step, and stirring is performed for 1 h to form a shell. Although the amount of the resin particle dispersion liquid added is not particularly limited, it is preferable to add the resin particle dispersion liquid in an amount of, for example, 0.1 to 5% by mass based on the total amount of the dispersion liquid.

The resin particles comprised in the resin particle dispersion liquid to be added may have the same structure as the resin particles used for the core particles or may have a different structure.

Sphering Step

After the above shell formation step, a sphering step may be performed as necessary. The sphering step can be carried out by adding a basic compound such as sodium hydroxide to the dispersion liquid, adjusting the pH to a range of 8.5 to 9.5, and raising the temperature to 85 to 100° C. By performing the above sphering step, the shape factor SF-1 of the toner can be reduced.

Step of Obtaining Toner Particles (Fusion Step and Post-Treatment Step)

First, the aggregation of the dispersion liquid comprising the aggregates obtained in the aggregation step is stopped. The aggregation is stopped by adding an aggregation stopper that can adjust the pH under stirring similar to that in the aggregation step.

If necessary, a cooling step may be performed in which the temperature of the dispersion liquid comprising toner particles obtained in the fusion step is lowered to a temperature lower than the crystallization temperature and/or the glass transition temperature of the binder resin. Additionally, post-treatment steps such as a washing step, a solid-liquid separation step, a drying step, a classification step, and the like may be performed as necessary.

External Addition Step

A toner is obtained by externally adding silica fine particles as an external additive to the surface of toner particles by the method described above. Further, other external additives may be added in addition to the silica fine particles, if necessary. Other external additives include, for example, hydrotalcite particles, charging aids, conductivity imparting agents, flowability imparting agents, anti-caking agents, release agents for hot roller fixing, lubricants, resin fine particles and inorganic fine particles acting as abrasives, and the like. It is preferable that the hydrotalcite particles comprise fluorine. Fluorine-comprising hydrotalcite particles can be those produced by a known method.

The external additive mixing time when externally adding the external additive to the toner particles is preferably 3 to 20 min. Further, the amount of silica fine particles added is preferably 0.1 to 5.0 parts by mass based on 100.0 parts by mass of toner particles.

The first toner has silica fine particles externally added to the surface of the first toner particle. Silica fine particles are not particularly limited and examples thereof include methyltrimethoxysilane, methyltriethoxysilane, methyltrichlorosilane, ethyltrimethoxysilane, ethyltriethoxysilane, ethyltrichlorosilane, ethyltriacetoxysilane, propyltrimethoxysilane, propyltriethoxysilane, propyltrichlorosilane, butyltrimethoxysilane, butyltriethoxysilane, butyltrichlorosilane, butylmethoxydichlorosilane, butylethoxydichlorosilane, hexyltrimethoxysilane, hexyltriethoxysilane, phenyltrimethoxysilane, phenyltriethoxysilane, and the like. Commercially available products include silica particles RY200 (manufactured by Nippon Aerosil Co., Ltd.). These can be used alone or in combination.

The particle diameter of the first toner is not particularly limited but is preferably 5.0 to 10.0 μm.

From the viewpoint of the effect of reducing the remaining amount of toner in the toner storage container after toner replenishment, the SF-1 of the second toner is preferably from 100 to 140, more preferably from 105 to 125. It is thought that the closer the second toner is to a spherical shape, the better the rolling properties are, and the more efficiently the overcharging caused by the connecting portion is alleviated. The SF-1 of the second toner can be achieved by a known production method, but from the viewpoint of ease of production, it is particularly preferable to produce the toner by a suspension polymerization method. A method for producing toner using a suspension polymerization method will be described hereinbelow.

Method for Producing Toner by Suspension Polymerization Method

For example, each pre-synthesized polymerizable monomer and, if necessary, other materials such as a colorant, a release agent, and a charge control agent are mixed and uniformly dissolved or dispersed to prepare a polymerizable monomer composition.

Thereafter, the polymerizable monomer composition is dispersed in an aqueous medium using a stirrer or the like to prepare suspended particles of the polymerizable monomer composition. Thereafter, toner particles are obtained by polymerizing the polymerizable monomer comprised in the particles using a polymerization initiator or the like.

Using the obtained toner particle, a surface layer comprising an organosilicon polymer is formed on the surface of the toner particle, thereby forming a portion formed by connecting a plurality of protrusions comprising silicon on the toner particle surface.

After the polymerization is completed, the toner particles are filtered, washed, and dried by known methods, and if necessary, external additives are added to obtain the toner.

As the polymerization initiator, it is possible to use a known polymerization initiator.

Examples of the polymerization initiator include azo-based or diazo-based polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and the like; peroxide-based polymerization initiators such as benzoyl peroxide, t-butylperoxy 2-ethylhexanoate, t-butylperoxypivalate, t-butylperoxyisobutyrate, t-butylperoxyneodecanoate, methyl ethyl ketone peroxide, diisopropyl peroxycarbonate, cumene hydroperoxide, 2,4-dichlorobenzoyl peroxide, lauroyl peroxide, and the like. Commercially available products include Perbutyl PV (manufactured by NOF Corporation).

The aqueous medium may comprise an inorganic or organic dispersion stabilizer. As the dispersion stabilizer, it is possible to use a known dispersion stabilizer.

Examples of inorganic dispersion stabilizers include phosphates such as hydroxyapatite, tribasic calcium phosphate, dibasic calcium phosphate, sodium phosphate, magnesium phosphate, aluminum phosphate, and zinc phosphate; carbonates such as calcium carbonate and magnesium carbonate; metal hydroxides such as calcium hydroxide, magnesium hydroxide, and aluminum hydroxide; sulfates such as calcium sulfate and barium sulfate; calcium metasilicate; bentonite; silica; and alumina.

When using an inorganic compound as a dispersion stabilizer, a commercially available one may be used as is, but in order to obtain finer particles, the above-mentioned inorganic compound may be generated in an aqueous medium and used.

Meanwhile, examples of organic dispersion stabilizers include polyvinyl alcohol, gelatin, methylcellulose, methylhydroxypropylcellulose, ethylcellulose, sodium salt of carboxymethylcellulose, polyacrylic acid and salts thereof, and starch.

The aqueous medium may comprise a surfactant. As the surfactant, known surfactants can be used. Examples include anionic surfactants such as sodium dodecylbenzene sulfate and sodium oleate; cationic surfactants; amphoteric surfactants; nonionic surfactants; and the like.

It is preferable to use an organosilicon compound for the surface layer that has been subjected in advance to a hydrolysis process in a separate container. After the granulation step of the toner particles, a hydrolysate of the obtained organosilicon compound is added and a polymerization step is performed, thereby forming a surface layer having protrusions connected to the surface of the toner particle.

For example, the feed ratio for hydrolysis is preferably from 50 to 100 parts by mass of the organosilicon compound per 100 parts by mass of water from which ions have been removed, such as ion-exchanged water or RO water. The conditions for hydrolysis are, for example, preferably a pH of 2 to 7, a temperature of 15 to 80° C., and a time of 30 to 600 min.

Examples of organosilicon compounds include the following.

Trifunctional methylsilanes such as methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, and methyldiethoxyhydroxysilane.

Trifunctional silanes such as ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane, and hexyltrihydroxysilane.

Trifunctional phenylsilanes such as phenyltrimethoxysilane, phenyltriethoxysilane, phenyltrichlorosilane, phenyltriacetoxysilane, and phenyltrihydroxysilane.

These organosilicon compounds can be used alone or in combination.

The particle diameter of the second toner is not particularly limited but is preferably 5.0 to 10.0 μm.

As the binder resin comprised in the first toner particles and the second toner particles, known binder resins can be used. For example, examples of the binder resin include the following.

Styrene resins, styrene copolymer resins, polyester resins, polyol resins, polyvinyl chloride resin, phenol resins, natural resin-modified phenol resins, natural resin-modified maleic acid resins, acrylic resins, methacrylic resins, polyvinyl acetate, silicone resins, polyurethane resins, polyamide resins, furan resins, epoxy resins, xylene resins, polyvinyl butyral, terpene resins, coumarone indene resins, petroleum resins. These resins may be used alone or in combination of two or more.

Polyester resins can be obtained by selecting and combining suitable ones from polyhydric carboxylic acids, polyols, hydroxycarboxylic acids, and the like, and synthesizing them using conventionally known methods such as transesterification or polycondensation.

The second toner particles preferably comprise styrene acrylic resin as a binder resin. When a portion formed by connecting a plurality of protrusions comprising silicon is formed on the toner particle surface by using an organosilicon polymer as described above, it is preferable to include a styrene acrylic resin as a binder resin because an affinity between the protrusions and the toner core is increased. As a result, deterioration due to peeling of the protrusions over time or under harsh environments is suppressed, and the remaining amount of toner in the toner storage container after toner replenishment can be reduced even after the container has been allowed to stand in a harsh environment.

Release Agent

A known wax can be used as a release agent in the toner.

Specific examples include petroleum waxes represented by paraffin wax, microcrystalline wax, petrolactam, and derivatives thereof, montan wax and derivatives thereof, hydrocarbon waxes produced by the Fischer-Tropsch process and derivatives thereof, polyolefin waxes represented by polyethylene and derivatives thereof, natural waxes represented by carnauba wax and candelilla wax, and derivatives thereof. Derivatives also include oxides, block copolymers with vinyl monomers, and graft modified products.

Other examples include alcohols such as higher aliphatic alcohols; fatty acids such as stearic acid, palmitic acid, and the like or acid amides, esters, and ketones thereof, hydrogenated castor oil and derivatives thereof, vegetable waxes, and animal waxes.

Among these, it is preferable to use hydrocarbon wax. The above waxes can be used alone or in combination.

Colorant

The toner particle may comprise a colorant. Known pigments and dyes can be used as the colorant.

Examples of cyan pigments include copper phthalocyanine compounds and derivatives thereof, anthraquinone compounds, basic dye lake compound and the like. Specific examples are presented hereinbelow.

C. I. Pigment Blue 1, 7, 15, 15:1, 15:2, 15:3, 15:4, 60, 62, 66.

Examples of magenta pigments include condensation azo compounds, diketopyrrolopyrrole compounds, anthraquinone compounds, quinacridone compounds, basic dye lake compounds, naphthol compounds, benzimidazolone compounds, thioindigo compounds, perylene compounds. Specific examples are presented hereinbelow.

C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 254, C. I. Pigment Violet 19.

Examples of yellow pigments include condensed azo compounds, isoindolinone compounds, anthraquinone compounds, azo metal complexes, methine compounds, and allylamide compounds. Specific examples are presented hereinbelow.

C. I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191, 194.

Examples of the black colorant include carbon black and those toned to black by using the abovementioned yellow colorants, magenta colorants, and cyan colorants. These colorants can be used alone or in a mixture, or in the form of a solid solution.

Charge Control Agent

The toner particle may comprise a charge control agent.

As the charge control agent, known ones can be used, and charge control agents that have a fast triboelectric charging speed and can stably maintain a constant triboelectric charge quantity are particularly preferred. Furthermore, when toner particles are produced by a suspension polymerization method, a charge control agent that has low polymerization inhibiting properties and substantially no solubilizable material in an aqueous medium is particularly preferred.

EXAMPLES

Methods for Measuring Physical Properties of Toner

Hereinafter, methods for measuring various physical properties of toner will be explained.

Content of Second Toner Particles Relative to First Toner Particles

First, a method for confirming that the toner comprises portions formed by connecting a plurality of protrusions comprising silicon will be described. The fact that the toner comprises portions formed by connecting a plurality of protrusions comprising silicon is confirmed by burning the toner and observing the remaining components.

The burning of toner is performed using a thermogravimetric measuring device "Q5000IR" (manufactured by PerkinElmer Corp.). A total of 100 particles of toner are placed on a sample pan recommended for the device. At this time, an optical microscope is used to confirm that the toner particles are not in contact with each other. The measurement is started by programming to set the chamber environment to a temperature of 30° ° C. and a relative humidity of 0%, hold for 24 h, then raise the temperature to 800° C. at a rate of 800° C./min, hold at 800° ° C. for 1 min, and then lower the temperature to 30° C. at a rate of 10° C./sec. Any heating means may be used as long as the same temperature raising rate, attained temperature, and temperature lowering rate can be achieved.

It is confirmed that the toner comprises a connected body comprising silicon by performing scanning electron microscopy (SEM) observation and energy dispersive X-ray analysis (EDS) measurement of the burned toner as described below.

The SEM device and observation conditions are as follows.

Device used: ULTRA PLUS manufactured by Carl Zeiss Microscopy Co., Ltd.

Accelerating voltage: 1.0 kV

WD: 2.0 mm

Aperture Size: 30.0 μm

Detection signal: SE2 (secondary electrons)

Observation magnification: 5000×

Contrast: 63.0±5.0% (reference value)

Brightness: 38.0±5.0% (reference value)

Image size: 1024×768 pixels

Pretreatment: None (no vapor deposition)

Contrast and brightness are set as appropriate according to the condition of the device used. Further, the accelerating voltage is set so as to achieve items such as acquisition of a secondary electron image and prevention of charge-up of an undeposited sample. In addition, the observation magnification is set as appropriate according to the toner particle diameter so that one toner particle can enter the field of view without excess or deficiency.

Figure 5:
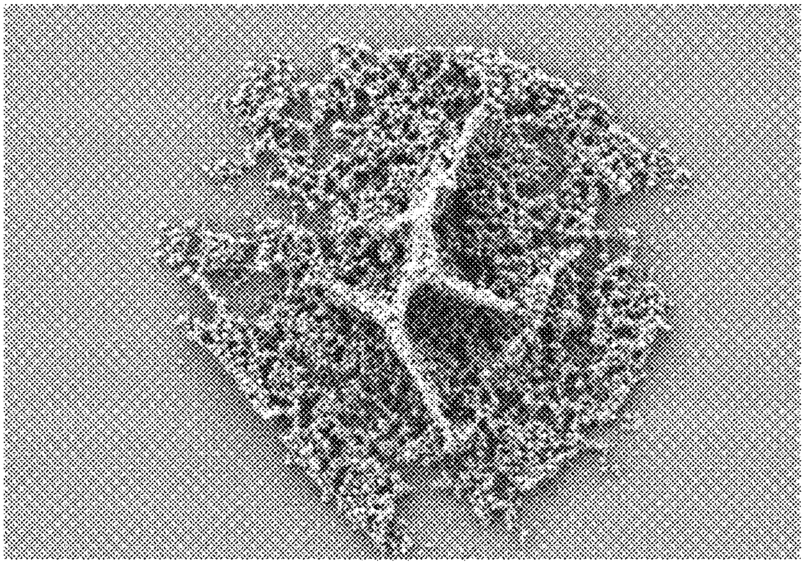
FIG. 5 is a shape image when components remaining after toner burning have a film-like shape.
Figure 6:
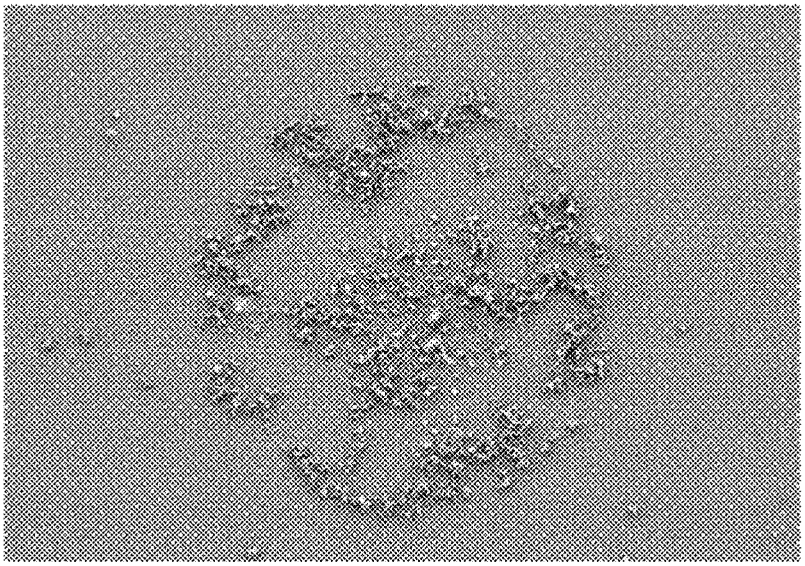
FIG. 6 is a shape image when components remaining after toner burning do not have a film-like shape.

A secondary electron image is generally also called a shape image and is known to be acquired as a contrasting image that reflects the unevenness of the sample, making it possible to confirm the shape of the component remaining after burning the toner. The shape of the remaining component of each toner particle is observed, and where the remaining component has a film-like shape, it is determined that the toner comprises a connected body comprising silicon. It is conceivable that where the toner comprises a portion formed by connecting a plurality of protrusions comprising silicon, the connected structure will form a film covering the surface layer of the toner, so that the film-like shape is maintained even after burning. Meanwhile, where the toner has no portion formed by connecting a plurality of protrusions comprising silicon, the external additives and the like do not have a connected structure, and therefore remain in the form of dispersed or aggregated particles. FIG. 5 shows an example of a shape image when a film-like shape is observed, and FIG. 6 shows a shape image when the film-like shape is not observed.

The toner is burned using the method described above, the secondary electron image of the remaining component is observed, the number of first toner particles and second toner particles is determined for a total of 1000 toner particles, and the content of the second toner particles related to that of the first toner particles is calculated. Where the temperature raising rate is slow, the connected structure may collapse as the toner core particle melts, so the temperature raising rate during burning is preferably 700° C./min or more, more preferably 800° C./min or more.

The fact that the connected body contains silicon is confirmed by energy dispersive X-ray analysis (EDS) that can be obtained by SEM.

The SEM/EDS device and observation conditions are as follows.

Device used (SEM): ULTRA PLUS manufactured by Carl Zeiss Microscopy Co., Ltd.

Device used (EDS): NORAN System 7, Ultra Dry EDS Detecter manufactured by Thermo Fisher Scientific Co., Ltd.

Accelerating voltage: 5.0 kV

WD: 7.0 mm

Aperture Size: 30.0 μm

Detection signal: SE2 (secondary electrons)

Observation magnification: 5000×

Mode: Spectral Imaging

Pretreatment: platinum sputtering

The EDS mapping image of the silicon element obtained by the above method is superimposed on the shape image, and matching of the silicon atom part in the mapping image and the film shape part in the shape image is confirmed. Thereby, it can be confirmed that the connected body contains silicon. That is, a toner particle for which the shape image has a film-like shape and in which the connected body comprises silicon is determined to be the second toner particle.

Identification Method of Fluorine-Comprsing Hydrotalcite Particles

The measurement of each element ratio of the hydrotalcite particle is performed by EDS mapping measurement of the toner using a scanning transmission electron microscope (STEM). In EDS mapping measurement, spectral data are held for each pixel in the analysis area. By using a silicon drift detector with a large detection element area, EDS mapping can be measured with high sensitivity.

By performing statistical analysis on the spectral data of each pixel obtained by EDS mapping measurement, principal component mapping that extracts pixels with similar spectra can be obtained, and mapping with specific components becomes possible.

The sample for observation is prepared using the following procedure.

A total of 0.5 g of toner is weighed and allowed to stand for 2 min under a load of 40 kN by using a Newton press with a cylindrical mold with a diameter of 8 mm to produce a cylindrical toner pellet with a diameter of 8 mm and a thickness of about 1 mm. A thin section with a thickness of 200 nm is prepared from the toner pellet using an ultramicrotome (Leica, FC7).

STEM-EDS mapping analysis is performed using the following devices and conditions.

Devices

Scanning transmission electron microscope: JEM-2800, manufactured by JEOL Ltd.

EDS detector: JED-2300T dry SD100GV detector (detection element area: 100 $mm^2$), manufactured by JEOL Ltd.

EDS analyzer: NORAN System 7, manufactured by Thermo Fisher Scientific Co., Ltd.

STEM-EDS Conditions

STEM acceleration voltage: 200 kV

Magnification: 20,000×

Probe size 1 nm

STEM image size: 1024×1024 pixels (EDS element mapping image at the same position is acquired)

EDS mapping size: 256×256 pixels, Dwell Time: 30 μs, Number of integrations: 100 frames The ratio of each element in the hydrotalcite particle is calculated as follows based on multivariate analysis.

EDS mapping is obtained using the above STEM-EDS analyzer. Next, multivariate analysis is performed on the collected spectral mapping data using the COMPASS (PCA) mode in the measurement command of NORAN System 7 mentioned above, and a principal component map image is extracted.

At that time, the setting values are as follows.

Kernel size: 3×3

Quantitative map setting: High (slow)

Filter fit type: High precision (slow)

At the same time, through this operation, the area ratio of each extracted principal component in the EDS measurement field of view is calculated. Quantitative analysis is performed using the Cliff-Lorimer method on the EDS spectrum of each principal component mapping obtained.

The toner particle portion and the hydrotalcite particles are distinguished based on the above quantitative analysis results of the obtained STEM-EDS principal component mapping. The particles can be identified as fluorine-comprising hydrotalcite particles from the particle size, shape, content of polyvalent metals such as aluminum and magnesium, fluorine content, and weight ratios thereof.

Furthermore, the content of fluorine-comprising hydrotalcite particles in a toner particle can be calculated using fluorescent X-ray analysis and a calibration curve created from a standard sample. For example, the content of hydrotalcite particles can analyzed and calculated from the Al and Mg elemental intensities by using a calibration curve method. Specifically, it is calculated by the following method.

A wavelength-dispersive X-ray fluorescence spectrometer "Axios" (manufactured by PANalytical Co.) and the dedicated software "SuperQ ver. 4.0F" (manufactured by PANalytical Co.) provided therewith for setting measurement conditions and analyzing measurement data are used. Rh is used as the anode of the X-ray tube, the measurement atmosphere is vacuum, the measurement diameter (collimator mask diameter) is 10 mm, and the measurement time is 10 sec. Further, when measuring light elements, detection is performed with a proportional counter (PC), and when measuring heavy elements, detection is performed with a scintillation counter (SC). Measurement is performed under the above conditions, the elements are identified based on the peak position of the obtained X-rays, and concentration thereof is calculated from the count rate (unit: cps), which is the number of X-ray photons per unit time.

A pellet to be used as a measurement sample is obtained by placing 1 g of toner in a special press aluminum ring, flattening, and pressurizing at 20 MPa for 60 sec and molding to a thickness of 2 mm by a tablet molding and compressing machine "BRE-32" (manufactured by Maekawa Testing Machine MFG Co., Ltd.). The content is calculated from the obtained peak intensity based on a calibration curve created from samples with a content known in advance.

Identification Method of Needle-Shaped Titania Particles

Needle-shaped titania particles are identified by powder X-ray diffraction measurement and aspect ratio measurement. In the following analysis, the toner may be used, or the external additive and toner particle may be separated as necessary and only the external additive may be used.

Powder X-ray Diffraction Measurement

Identification of titania is performed with an inorganic materials database (Atom Work) of the National Institute for Materials Science (NIMS) from the chart obtained from powder X-ray diffraction using X-rays of CuK$\alpha$. The powder X-ray diffraction measurement conditions are shown below.

Measuring device used: X-ray diffraction device RINT-TTRII (manufactured by Rigaku Denki Co., Ltd.)
X-ray tube: Cu
Tube voltage: 50 kV
Tube current: 300 mA
Scan method: 2$\theta$/$\theta$ scan
Scan speed: 4.0°/min
Sampling interval: 0.02°
Start angle (2$\theta$): 5.0°
Stop angle (2$\theta$): 40.0°
Attachment: Standard sample holder
Filter: not used
Incident monochromator: used
Counter monochromator: not used
Divergence slit: open
Divergence vertical restriction slit: 10.00 mm
Scattering slit: open
Light receiving slit: open
Flat plate monochromator: used
Counter: scintillation counter Measurement of Major Axis, Minor Axis, and Aspect Ratio of Titania Particles Next, the particle diameter and aspect ratio of the titania particles are measured. The major axis (maximum diameter) and aspect ratio are determined using a scanning electron microscope (for example, scanning electron microscope "S-4800" (trade name; manufactured by Hitachi, Ltd.)). The toner is observed in a field of view magnified up to 50,000 times, and the major axis and minor axis of the primary particles of the external additive are measured. The aspect ratio of the external additive is calculated using the following formula. The observation magnification is adjusted as appropriate depending on the size of the external additive.

Aspect ratio of external additive=(major axis of external additive)÷(minor axis of external additive)

Where the major axis (maximum diameter) is from 100 nm to 3000 nm and the aspect ratio is 5.0 or more, titania is determined to be needle-shaped titania. Furthermore, the content of needle-shaped titania particles in a toner particle can be calculated using fluorescent X-ray analysis and a calibration curve created from a standard sample. For example, the content of needle-shaped titania particles can be analyzed from the Ti element intensity using the calibration curve method and calculated by the method described above.

Measurement of Toner Particle Diameter

The particle diameter of the toner is measured as follows. A precision particle size distribution measuring apparatus based on a pore electric resistance method with a 100 μm aperture tube (a Coulter Counter Multisizer 3 (registered trademark) produced by Beckman Coulter, Inc.) and dedicated software for the measurement apparatus (Beckman Coulter Multisizer 3 Version 3.51 produced by Beckman Coulter, Inc.) for setting measurement conditions and analysis of measured data are used for measurement. The measurements are carried out using 25,000 effective measurement channels, and then measurement data is analyzed and calculated.

A solution obtained by dissolving special grade sodium chloride in ion exchanged water at a concentration of 1 mass %, such as "ISOTON II" (produced by Beckman Coulter), can be used as an aqueous electrolyte solution used in the measurements.

The dedicated software was set up in the following way before carrying out measurements and analysis. On the "Standard Operating Method (SOM) alteration" screen in the dedicated software, the total count number in control mode is set to 50,000 particles, the number of measurements is set to 1, and the Kd value is set to the value obtained by using "standard particle 10.0 μm" (Beckman Coulter). By pressing the "Threshold value/noise level measurement button", threshold values and noise levels are automatically set. In addition, the current is set to 1600 μA, the gain is set to 2, the electrolyte solution is set to ISOTON II, and the "Flush aperture tube after measurement" option is checked. On the "Conversion settings from pulse to particle diameter" screen in the dedicated software, the bin interval is set to logarithmic particle diameter, the particle diameter bin is set to 256 particle diameter bin, and the particle diameter range is set to from 2 to 60 μm.

The specific measurement method is as follows.

(1) 200 mL of the aqueous electrolyte solution is placed in a dedicated Multisizer 3 250 mL glass round bottomed beaker, the beaker is set on a sample stand, and a stirring rod is rotated anticlockwise at a rate of 24 rotations/second. By carrying out the "Aperture tube flush" function of the dedicated software, dirt and bubbles in the aperture tube are removed.

(2) 30 mL of the aqueous electrolyte solution is placed in a 100 mL glass flat bottomed beaker. 0.3 mL of a diluted liquid, which is obtained by diluting "Contaminon N" (a 10 mass % aqueous solution of a neutral detergent for cleaning precision measurement equipment, which has a pH of 7 and comprises a non-ionic surfactant, an anionic surfactant and an organic builder, available from Wako Pure Chemical Industries, Ltd.) 3-fold in terms of mass with ion exchanged water, is added to the beaker as a dispersant.

(3) An ultrasonic wave disperser (Ultrasonic Dispersion System Tetra 150 produced by Nikkaki Bios Co., Ltd.) having an electrical output of 120 W, in which two oscillators having an oscillation frequency of 50 kHz are housed so that their phases are staggered by 180° is prepared. A predetermined amount of ion exchanged water is placed in a water bath in the ultrasonic dispersion system, and 2 mL of Contaminon Nis added to this water bath.

(4) The beaker mentioned in step (2) above is placed in a beaker-fixing hole in the ultrasonic wave disperser, and the ultrasonic wave disperser is activated. The height of the beaker is adjusted so that the resonant state of the liquid surface of the aqueous electrolyte solution in the beaker is at a maximum.

(5) While the aqueous electrolyte solution in the beaker mentioned in section (4) above is being irradiated with ultrasonic waves, 10 mg of toner is added a little at a time to the aqueous electrolyte solution and dispersed therein. The ultrasonic wave dispersion treatment is continued for a further 60 seconds. When carrying out the ultrasonic wave dispersion, the temperature of the water bath is adjusted as appropriate to a temperature of from 10° ° C. to 40° ° C.

(6) The aqueous electrolyte solution mentioned in section (5) above, in which the toner is dispersed, is added dropwise by means of a pipette to the round bottomed beaker mentioned in section (1) above, which is disposed on the sample stand, and the measurement concentration is adjusted to 5%. Measurements are carried out until the number of particles measured reaches 50,000.

(7) The measurement data are analyzed using the dedicated software provided with the device, and the weight-average particle diameter is calculated and used as the toner particle diameter. In addition, the "average diameter" on the analysis/volume statistics (arithmetic mean) screen, when setting the graph/volume % in the dedicated software, is the weight-average particle diameter. Furthermore, the "central diameter" on the analysis/volume statistics (arithmetic mean) screen is the volume-based median diameter.

Method for Measuring Shape Factor SF-1 of Toner

The toner is observed using an FE-SEM (trade name: S-4700) manufactured by Hitachi, Ltd. at a magnification of 2000 times.

The obtained toner image is analyzed using image analysis software (trade name: analySIS Pro) manufactured by Olympus Corporation. The absolute maximum length R, peripheral length L, and cross-sectional area S of the toner are obtained. From the obtained peripheral length of the toner, the circle-equivalent diameter r is obtained by the circle-equivalent diameter $r=L/\pi$, and an object for which this value is within a range of ±10% of the weight average particle diameter D4 obtained by the aforementioned method using a Coulter counter is taken as a corresponding particle.

A total of 50 of the corresponding particles are randomly selected, the average of the absolute maximum lengths of the cross sections thereof is taken as Rave, the average of the cross section areas is taken as Save, and the value of the toner shape factor SF-1 is obtained from the following formula.

$$\text{Shape factor SF-1}=(Rave^2\times\pi)/(Save\times4)\times100$$

Method for Measuring Content of Silica Fine Particles

A wavelength-dispersive X-ray fluorescence spectrometer "Axios" (manufactured by PANalytical Co.) and the dedicated software "SuperQ ver. 4.0F" (manufactured by PANalytical Co.) provided therewith for setting measurement conditions and analyzing measurement data are used. Rh is used as the anode of the X-ray tube, the measurement atmosphere is vacuum, the measurement diameter (collimator mask diameter) is 27 mm, and the measurement time is 10 sec. Further, when measuring light elements, detection is performed with a proportional counter (PC), and when measuring heavy elements, detection is performed with a scintillation counter (SC).

A pellet to be used as a measurement sample is obtained by placing 4 g of toner in a special press aluminum ring, flattening, and pressurizing at 20 MPa for 60 sec and molding to a thickness of 2 mm and a diameter of 39 mm by a tablet molding and compressing machine "BRE-32" (manufactured by Maekawa Testing Machine MFG Co., Ltd.).

Silica ($SiO_2$) fine powder is added to obtain 0.5 parts with respect to 100 parts of silicon-free resin particles, and thorough mixing is performed using a coffee mill. Similarly, silica fine powder is mixed with resin particles to obtain 5.0 parts and 10.0 parts, respectively, and these are used as samples for a calibration curve.

For each sample, a sample pellet for the calibration curve is prepared as described above using a tablet molding and compressing machine, and when PET is used as a spectroscopic crystal, the count rate (unit: cps) of Si-Kα rays observed at a diffraction angle (2θ) of 109.08° is measured. At this time, the accelerating voltage and current value of the X-ray generator are 24 kV and 100 mA, respectively. A linear function calibration curve is obtained by plotting the obtained X-ray count rate against the ordinate and the amount of $SiO_2$ added in each calibration curve sample against the abscissa. Next, the toner to be analyzed is made into a pellet using the tablet molding and compressing machine as described above, and the count rate of the Si-Kα rays is measured. Then, the value on the abscissa is read from the above calibration curve, and this value is taken as the content of the silica fine particles.

Method for Identifying Binder Resin

The binder resin comprised in the toner particles of the toner can be identified by NMR analysis and pyrolysis GCMS analysis.

Method for Identifying Resin Type by NMR

The resin type of the binder resin is identified using nuclear magnetic resonance spectroscopy (1H-NMR) [400 MHZ, $CDCl_3$, room temperature (25° C.)] or pyrolysis GCMS.

Nuclear magnetic resonance spectroscopy (1H-NMR) Measurement Conditions

Device: FT NMR device JNM-EX400 (manufactured by JEOL Ltd.)

Measurement frequency: 400 MHZ

Pulse condition: 5.0 μs

Frequency range: 10,500 Hz

Number of integrations: 64 times

Measurement temperature: 30° ° C.

Sample: prepared by placing 50 mg of the measurement sample in a sample tube having an inner diameter of 5 mm, adding deuterated chloroform ($CDCl_3$) as a solvent, and dissolving in a thermostat at 40° ° C.

Measurement Conditions for Pyrolysis GCMS

Measuring device: pyrolysis GCMS device

Pyrolysis device: Curie point pyrolyzer JPS700 (manufactured by Nippon Analytical Industry Co., Ltd.)

Pyrofoil: F590 (Curie point 590° C.)

GCMS: Focus GC/ISQ (manufactured by Thermo Fisher Scientific Co., Ltd.)

Carrier gas: He gas (purity 99.99995%)

Column: HP-5MS (30 m, inner diameter 0.25 mm, film thickness 0.25 μm)

Inlet temperature: 280° C., MS transfer temperature: 280° C., ion source temperature: 250° ° C.

Oven temperature: start at 50° C. and hold for 3 min, then raise the temperature to 300° C. at 10° C./min and hold for 30 min Helium flow rate: 1.2 mL/min, constant flow control Split ratio: 20:1

MS ion source: EI, MS detection range (m/z): 25 to 800

Library: NIST

Under the above measurement conditions, 0.5 mg of toner and 5 μL of methylation reagent (tetramethylammonium hydroxide 10% methanol solution) are added to Pyrofoil and analysis is performed.

Evaluation of Remaining Amount of Toner in Toner Pack after Replenishment

The remaining amount of toner in the toner pack after replenishment is evaluated as follows.

The evaluation environment is 23° C./50% RH. Toner packs shown in FIGS. 2A and 2B, FIG. 3, and FIGS. 4A to 4D are prepared in which the angle of the inclined surface 102*g*3 in FIG. 4C is adjusted to a freely determined value. The toner storage space V is filled with 75.4 g of toner. Next, the air in the toner storage space V is degassed, and the storage portion 101 is deformed to reduce the volume of the toner storage space V, so that the filling amount per unit volume is 0.56 g/cm$^3$. After the toner pack is shaken back and forth 20 times in 10 sec at an amplitude of 10 cm, the toner pack is mounted on the mounting portion 106 of the image forming apparatus 1, and the discharge port 102*a* is opened. Subsequently, while supporting one surface of the storage portion 101 with four fingers other than the thumb, the other surface of the storage portion 101 is pressed with the thumb in the second direction Y with a force of 10 kgf to 15 kgf to deform the storage portion 101 and discharge the toner from the toner pack 100. After that, the toner pack is detached, and the remaining amount of toner is calculated from the change in weight before and after replenishment.

Production Example of Toner A1

| Preparation of Resin Particle Dispersion Liquid A1 | |
|---|---|
| Styrene | 75.0 parts |
| Butyl acrylate | 23.7 parts |
| Acrylic acid | 1.3 parts |
| n-Lauryl mercaptan | 3.2 parts |

The above materials were placed in a vessel and stirred to mix. An aqueous solution of 1.5 parts of Neogen RK (manufactured by Daiichi Kogyo Seiyaku Co., Ltd.) in 150.0 parts of ion-exchanged water was added to this solution and dispersed.

While stirring slowly for another 10 min, an aqueous solution of 0.3 parts of potassium persulfate and 10.0 parts of ion-exchanged water was added. After purging with nitrogen, emulsion polymerization was carried out at 70° ° C. for 6 h. After the polymerization was completed, the reaction solution was cooled to room temperature and ion-exchanged water was added to obtain resin particle dispersion liquid A1 with a solid fraction concentration of 12.5% by mass, a volume-based median diameter of 0.2 μm, and a glass transition temperature of 56° C.

Preparation of Release Agent Dispersion Liquid A1

A total of 100.0 parts of behenyl behenate (melting point: 72.1° C.) and 15.0 parts of Neogen RK were mixed with 385.0 parts of ion-exchanged water, and dispersed for 1 h using a wet jet mill JN100 (manufactured by Joko Co., Ltd.) to obtain a release agent dispersion liquid A1. The wax concentration in the release agent dispersion liquid A1 was 20.0% by mass.

Preparation of Colorant Dispersion Liquid A1

A total of 50.0 parts of copper phthalocyanine (Pigment Blue 15:3) as a colorant, and 5.0 parts of Neogen RK were mixed with 200.0 parts of ion-exchanged water and dispersed for 1 h using a wet jet mill JN100 to obtain a colorant dispersion liquid A1. The solid fraction concentration of colorant dispersion liquid A1 was 20.0% by mass.

| Production of Toner Particles A1 | |
|---|---|
| Resin particle dispersion liquid A1 | 265.0 parts |
| Release agent dispersion liquid A1 | 20.0 parts |
| Colorant dispersion liquid A1 | 8.0 parts |

As a core forming step, the above materials were placed in a round stainless steel flask and mixed. Subsequently, the mixture was dispersed for 10 min at 5000 r/min using a homogenizer (Ultra-Turrax T50, manufactured by IKA Works, Inc.). The temperature inside the vessel was adjusted to 30° C. while stirring, and a 1 mol/L aqueous sodium hydroxide solution was added to adjust the pH to 8.0.

As a flocculant, an aqueous solution of 0.25 parts of aluminum chloride dissolved in 10.0 parts of ion-exchanged water was added over 10 min while stirring at 30° C. After allowing to stand for 3 min, the temperature rise was started, the temperature was raised to 60° C., and aggregated particles were generated (core formation). The volume-based median diameter of the formed aggregated particles was conveniently confirmed using "Coulter Counter Multisizer 3" (registered trademark, manufactured by Beckman Coulter, Inc.). When the volume-based median diameter reached 7.0 μm, as a shell forming step, 15.0 parts of resin particle dispersion liquid A1 was added and further stirring was performed for 1 h to form a shell.

Thereafter, a 1 mol/L aqueous sodium hydroxide solution was added to adjust the pH to 9.0, and the temperature was raised to 90° C. to spheroidize the aggregated particles. When the desired SF-1 was reached, the temperature decrease was started and the system was cooled to room temperature to obtain a toner particle dispersion liquid A1.

Hydrochloric acid was added to the obtained toner particle dispersion liquid A1 to adjust the pH to 1.5 or less, and stirring was performed for 1 h, followed by solid-liquid separation using a pressure filter to obtain a toner cake. This was reslurried with ion-exchanged water to form a dispersion liquid again, and then solid-liquid separation was performed using the aforementioned filter. After repeating the reslurrying and solid-liquid separation until the electrical conductivity of the filtrate became 5.0 uS/cm or less, solid-liquid separation was finally performed to obtain a toner cake. The obtained toner cake was dried and further classified using a classifier so that the volume-based median diameter was 7.0 μm to obtain toner particles A1.

Production Example of Toner A1

To the toner particles A1 (100.0 parts) obtained above, silica particles RY200 (manufactured by Nippon Aerosil Co., Ltd.) (1.5 parts) were externally added and mixed using FM10C (manufactured by Nippon Coke Industries Co., Ltd.). The external addition conditions were as follows: the lower blade was an A0 blade, the distance from a deflector wall was set to 20 mm, the amount of toner particles charged: 2.0 kg, the rotation speed: 66.6 $s^{-1}$, the external addition time: 10 min, and cooling water was used at a temperature of 20° C. and a flow rate of 10 L/min.

Toner A1 was thereafter obtained by sieving through a mesh with an opening of 200 μm. Table 1 shows the physical properties of the obtained toner A1.

Production Examples of Toners A2 to A5

Toners A2 to A5 were obtained in the same manner as in the production example of toner A1, except that the time of the sphering step was changed. Table 1 shows the physical properties of the obtained toners A2 to A5.

Production Example of Toner A6

Binder resin A: 80.0 parts
(Styrene acrylic resin with a mass ratio of styrene and n-butyl acrylate of 78:22; Mw=180,000, Tg=58° C.)
Binder resin B: 20.0 parts
(Styrene acrylic resin with a mass ratio of styrene and n-butyl acrylate of 90:10; Mw=5300, Tg=58° C.)
Hydrocarbon wax (paraffin wax HNP-9, manufactured by Nippon Seiro Co., Ltd.): 5.0 parts
3,5-Di-t-butylsalicylic acid aluminum compound: 0.5 parts
Carbon black: 5.0 parts The above materials were mixed using a Henschel mixer (Model FM-75, manufactured by Mitsui Mining Co., Ltd.) at a rotation speed of 20 $s^{-1}$ and a rotation time of 5 min and then kneaded with a twin-screw kneader (PCM-30, manufactured by Ikegai Co., Ltd.) set to a temperature of 130° C. (kneading was carried out twice). The obtained kneaded product was cooled to 25° C. and coarsely pulverized to 1 mm or less using a hammer mill to obtain a coarsely pulverized product. The obtained coarsely pulverized product was finely pulverized using a mechanical pulverizer (T-250, manufactured by Turbo Kogyo Co., Ltd.). The toner precursor particles having a weight-average particle diameter (D4) of 7.2 μm were obtained by classification using a multi-division classifier utilizing the Coanda effect.

Next, a wind classifier utilizing the Coanda effect ("Elbow Jet Lab EJ-L3", manufactured by Nippon Steel Mining Co., Ltd.) was used to simultaneously classify and remove fine powder and coarse powder from the toner precursor particles, thereby obtaining toner particles A6.

To the toner particles A6 (100.0 parts) obtained above, silica particles RY200 (manufactured by Nippon Aerosil Co., Ltd.) (1.5 parts) were externally added and mixed using FM10C (manufactured by Nippon Coke Industries Co., Ltd.). The external addition conditions were as follows: the lower blade was an A0 blade, the distance from a deflector wall was set to 20 mm, the amount of toner particles charged: 2.0 kg, the rotation speed: 66.6 $s^{-1}$, the external addition time: 10 min, and cooling water was used at a temperature of 20° C. and a flow rate of 10 L/min.

Toner A6 was thereafter obtained by sieving through a mesh with an opening of 200 μm. Table 1 shows the physical properties of the obtained toner A6.

Production Example of Toner A7

Production of Fluorine-Containing Hydrotalcite Particles A7

Hydrotalcite particles were fabricated by the method described in Japanese Patent Application Publication No. S55-028750 and WO 2013/147284. Specifically, hydrotalcite particles were produced as follows.

A mixed aqueous solution (liquid A) of 1.03 mol/L magnesium chloride and 0.239 mol/L aluminum sulfate, 0.753 mol/L sodium carbonate aqueous solution (liquid B), and 3.39 mol/L sodium hydroxide aqueous solution (liquid C) were prepared.

Next, using a metering pump, liquids A, B, and C were poured into the reaction tank at a flow rate that gave a liquid A:B volume ratio of 4.5:1, the pH value of the reaction liquid was maintained in the range of 9.3 to 9.6 with liquid C, and a precipitate was generated at a reaction temperature of 40° C. After filtration and washing, the precipitate was re-emulsified in ion-exchanged water to obtain a raw material hydrotalcite slurry. The hydrotalcite particles in the obtained hydrotalcite slurry had a concentration of 5.6% by mass.

The obtained hydrotalcite slurry was vacuum dried at 40° C. overnight. Sodium fluoride (NaF) was dissolved in ion-exchanged water to a concentration of 100 mg/L, a solution with the pH adjusted to 7.0 using 1 mol/L HCl or 1 mol/L NaOH was prepared, and dried hydrotalcite particles were added thereto at a concentration of 0.1% (w/v %). Constant speed stirring was performed for 48 h using a magnetic stirrer to prevent sedimentation. Thereafter, filtration using a membrane filter with a pore size of 0.5 μm, and washing with ion-exchanged water were performed. The obtained hydrotalcite particles were vacuum dried at 40° C. overnight, and then subjected to a crushing treatment. The obtained hydrotalcite particles A7 comprised fluorine and had a particle diameter of 400 nm.

Production Example of Toner A7

Toner A7 was obtained by the same method as in the production example of toner A1, except that silica particles RY200 (manufactured by Nippon Aerosil Co., Ltd.) (1.5 parts) in the external addition step were replaced with silica particles RY200 (manufactured by Nippon Aerosil Co., Ltd.) (1.5 parts) and hydrotalcite particles A7 (0.2 parts). Table 1 shows the physical properties of the obtained toner A7.

Production Example of Toner A8

| Synthesis of Polyester Resin 1 | |
|---|---|
| Bisphenol A ethylene oxide 2 mol adduct | 9 mol parts |
| Bisphenol A propylene oxide 2 mol adduct | 95 mol parts |
| Terephthalic acid | 50 mol parts |
| Fumaric acid | 30 mol part |
| Dodecenyl succinic acid | 25 mol parts |

The above monomers were charged into a flask equipped with a stirring device, a nitrogen introduction tube, a temperature sensor, and a rectification column, the temperature was raised to 195° C. in 1 h and it was confirmed that the inside of the reaction system was stirred uniformly. A total of 1.0 part of tin distearate was added to 100 parts of these monomers. Further, the temperature was raised from 195° C. to 250° C. over 5 h while distilling off the produced water, and the dehydration condensation reaction was further carried out at 250° C. for 2 h.

As a result, polyester resin 1 having a glass transition temperature of 60.2° C., an acid value of 16.8 mg KOH/g, a hydroxyl value of 28.2 mg KOH/g, a weight-average molecular weight of 11,200, and a number-average molecular weight of 4,100 was obtained.

| Synthesis of Polyester Resin 2 | |
|---|---|
| Bisphenol A ethylene oxide 2 mol adduct | 48 mol parts |
| Bisphenol A propylene oxide 2 mol adduct | 48 mol parts |
| Terephthalic acid | 65 mol parts |
| Dodecenyl succinic acid | 30 mol parts |

The above monomers were charged into a flask equipped with a stirring device, a nitrogen introduction tube, a temperature sensor, and a rectification column, the temperature was raised to 195° C. in 1 h and it was confirmed that the inside of the reaction system was stirred uniformly. A total of 0.7 part of tin distearate was added to 100 parts of these monomers. Further, the temperature was raised from 195° C. to 240° C. over 5 h while distilling off the produced water, and the dehydration condensation reaction was further carried out at 240° C. for 2 h. Next, the temperature was lowered to 190° C., 5 mol parts of trimellitic anhydride was gradually added, and the reaction was continued at 190° C. for 1 h.

As a result, polyester resin 2 having a glass transition temperature of 55.2° ° C., an acid value of 14.3 mg KOH/g, a hydroxyl value of 24.1 mg KOH/g, a weight-average molecular weight of 43,600, and a number-average molecular weight of 6,200 was obtained.

| Preparation of Resin Particle Dispersion Liquid A81 | |
|---|---|
| Polyester resin 1 | 100 parts |
| Methyl ethyl ketone | 50 parts |
| Isopropyl alcohol | 20 parts |

Methyl ethyl ketone and isopropyl alcohol were added to the vessel. Thereafter, the above materials were gradually added and stirred to completely dissolve them to obtain a polyester resin 1 solution. The vessel containing this polyester resin 1 solution was set at 65° C., a 10% ammonia aqueous solution was gradually added dropwise under stirring to a total of 5 parts, and then 230 parts of ion-exchanged water was gradually added dropwise at a rate of 10 ml/min to conduct phase inversion emulsification. Further, the solvent was removed by reducing the pressure with an evaporator to obtain a resin particle dispersion liquid A81 of polyester resin 1. The volume-average particle diameter of the resin particles in this dispersion liquid was 135 nm. Further, the solid content of the resin particles was adjusted to 20% with ion-exchanged water.

| Preparation of Resin Particle Dispersion Liquid A82 | |
|---|---|
| Polyester resin 2 | 100 parts |
| Methyl ethyl ketone | 50 parts |
| Isopropyl alcohol | 20 parts |

Methyl ethyl ketone and isopropyl alcohol were added to the vessel. Thereafter, the above materials were gradually added and stirred to completely dissolve them to obtain a polyester resin 2 solution. The vessel containing this polyester resin 2 solution was set at 40° C., a 10% ammonia aqueous solution was gradually added dropwise under stirring to a total of 3.5 parts, and then 230 parts of ion-exchanged water was gradually added dropwise at a rate of 10 ml/min to conduct phase inversion emulsification. Further, the solvent was removed by reducing the pressure with an evaporator to obtain a resin particle dispersion liquid A82 of polyester resin 2. The volume-average particle diameter of the resin particles in this dispersion liquid was 155 nm. Further, the solid content of the resin particles was adjusted to 20% with ion-exchanged water.

| Preparation of Colorant Particle Dispersion Liquid A8 | |
|---|---|
| Carbon black | 45 parts |
| Ionic surfactant Neogen RK (manufactured by Daiichi Kogyo Seiyaku Co., Ltd.) | 5 parts |
| Ion-exchanged water | 190 parts |

After mixing the above materials and dispersing for 10 min with a homogenizer, dispersion treatment was performed for 20 min under a pressure of 250 MPa using Ultimizer to obtain a colorant particle dispersion liquid A8 with a volume-average particle size of colorant particles of 120 nm and a solid fraction amount of 20%. The homogenizer used was Ultra-Turrax manufactured by IKA Works, Inc. As the Ultimizer, a counter-impingement wet crusher manufactured by Sugino Machine Co., Ltd. was used.

| Preparation of Release Agent Particle Dispersion Liquid A8 | |
|---|---|
| Release agent (hydrocarbon wax, melting point 79° C.) | 15 parts |

| | |
|---|---|
| Ionic surfactant Neogen RK (manufactured by Daiichi Kogyo Seiyaku Co., Ltd.) | 2 parts |
| Ion-exchanged water | 240 parts |

The above materials were heated to 100° C., thoroughly dispersed using an Ultra-Turrax T50 manufactured by IKA Works, Inc., and then heated to 115° C. to perform for dispersion treatment for 1 h using a pressure discharge type Gaulin Homogenizer. A release agent particle dispersion liquid A8 having a volume-average particle diameter of 160 nm and a solid fraction amount of 20% was obtained.

| Production of Toner Particles 1 | |
|---|---|
| Resin particle dispersion liquid A81 | 500 parts |
| Resin particle dispersion liquid A82 | 400 parts |
| Colorant particle dispersion liquid A8 | 50 parts |
| Release agent particle dispersion liquid A8 | 80 parts |

First, as a core forming step, the above materials were placed in a round stainless steel flask and mixed. Subsequently, the mixture was dispersed for 10 min at 5000 r/min using a homogenizer Ultra-Turrax T50 (manufactured by IKA Works, Inc.). After adding a 1.0% nitric acid aqueous solution and adjusting the pH to 3.0, the mixture was heated to 58° C. while adjusting the rotation speed as appropriate to stir the mixture by using a stirring blade in a heating water bath. The volume-average particle diameter of the formed aggregated particles was appropriately confirmed using Coulter Multisizer III, and when the aggregated particles (core) of 5.0 μm were formed, a shell forming step was performed by adding the following materials and further stirring for 1 h to form shells.

| | |
|---|---|
| Resin particle dispersion liquid A81 | 40 parts |
| Ion-exchanged water | 300 parts |
| 10.0% by mass borax aqueous solution | 19 parts |

(Borax: sodium tetraborate decahydrate manufactured by Fujifilm Wako Pure Chemical Industries, Ltd.)

Thereafter, the pH was adjusted to 9.0 using a 5% aqueous sodium hydroxide solution, and heating was performed to 89° ° C. while stirring was continued.

When the desired SF-1 was obtained, the heating was stopped, and cooling to 25° C., filtration and solid-liquid separation were performed, followed by washing with ion-exchanged water. After the washing was completed, toner particles A8 were obtained by drying using a vacuum dryer.

To the toner particles A8 (100.0 parts) obtained above, silica particles RY200 (manufactured by Nippon Aerosil Co., Ltd.) (1.5 parts) and needle-shaped titania FTL-100 (manufactured by Ishihara Sangyo Kaisha, Ltd.) (0.45 parts) were externally added and mixed using FM10C (manufactured by Nippon Coke Industries Co., Ltd.). The external addition conditions were as follows: the lower blade was an A0 blade, the distance from a deflector wall was set to 20 mm, the amount of toner particles charged: 2.0 kg, the rotation speed: 66.6 $s^{-1}$, the external addition time: 10 min, and cooling water was used at a temperature of 20° ° C. and a flow rate of 10 L/min.

Toner A8 was thereafter obtained by sieving through a mesh with an opening of 200 μm. Table 1 shows the physical properties of the obtained toner A8.

Production Example of Toner B1

Preparation Step of Aqueous Medium

A total of 7.0 parts of sodium phosphate (manufactured by Rasa Industries, Ltd., dodecahydrate) was added to 500.0 parts of ion-exchanged water in a reaction vessel and kept at 65° C. for 1.0 h while purging with nitrogen.

A calcium chloride aqueous solution prepared by dissolving 4.6 parts of calcium chloride (dihydrate) in 5.0 parts of ion-exchanged water was added all at once while stirring at 12,000 rpm by using T. K. Homomixer (manufactured by Tokushu Kika Kogyo Co., Ltd.), to prepare an aqueous medium comprising a dispersion stabilizer. Furthermore, 10% by mass hydrochloric acid was added to the aqueous medium to adjust the pH to 5.0 to obtain aqueous medium B1.

Hydrolysis Step of Organosilicon Compound for Surface Layer

A total of 60.0 parts of ion-exchanged water was weighed into a reaction vessel equipped with a stirrer and a thermometer, and the pH was adjusted to 3.0 using 10% by mass hydrochloric acid. This was heated with stirring until the temperature reached 25° C.

Thereafter, 40.0 parts of methyltriethoxysilane, which is an organosilicon compound for the surface layer, was added and hydrolyzed by stirring for 3 h or more. The end point of the hydrolysis was visually confirmed when the oil and water did not separate and became a single layer, and then cooling was performed to obtain a hydrolysate of the organosilicon compound for the surface layer.

Preparation Step of Polymerizable Monomer Composition

Styrene: 60.0 parts

Carbon black: 6.5 parts

The above materials were put into an attritor (manufactured by Mitsui Miike Kakoki Co., Ltd.) and further dispersed using zirconia particles with a diameter of 1.7 mm at 220 rpm for 5.0 h to prepare a pigment dispersion liquid. The following materials were added to the pigment dispersion liquid.

Styrene: 20.0 parts n-Butyl acrylate: 20.0 parts

Crosslinking agent (divinylbenzene): 0.8 parts

Ethylene glycol distearate: 18.0 parts

Polar resin: 3.0 parts (Styrene -2-hydroxyethyl methacrylate-methacrylic acid-methyl methacrylate copolymer, acid value 10 mg KOH/g, glass transition temperature (Tg) 80° C., weight-average molecular weight (Mw) 15,000)

These compounds were kept warm at 65° C. and uniformly dissolved and dispersed at 500 rpm by using T. K. Homomixer (manufactured by Tokushu Kika Kogyo Co., Ltd.) to prepare a polymerizable monomer composition.

Granulation Step

The polymerizable monomer composition was added to the aqueous medium B1 while maintaining the temperature of the aqueous medium B1 at 70° C. and the rotation speed of T. K. Homomixer at 12,000 rpm, and 9.0 parts of Perbutyl PV (10 hour half-life temperature: 54.6° C. (manufactured by NOF Corporation)), which is a polymerization initiator, was added. The mixture was granulated as is for 10 min with the stirring device while maintaining 12,000 rpm.

Polymerization Step

After the granulation step, the stirrer was replaced with a propeller stirring blade, polymerization was carried out by maintaining the temperature at 70° C. for 5.0 h while stirring at 150 rpm, the temperature was raised to 85° C. and heating was performed for 2 h to carry out a polymerization reaction, and the volatile components were distilled off by reducing the pressure for 3 h while maintaining the temperature at 85° C. to obtain core particles. When the temperature of the slurry was lowered to 55° C. and the pH was measured, the pH was 5.0. While stirring was continued at 55° C., 20.0 parts of the hydrolysate of the organosilicon compound for surface layer was added. After holding the slurry for 30 min as it was, the pH of the slurry was adjusted to 9.0 using an aqueous sodium hydroxide solution, and the slurry was held for an additional 300 min to form a surface layer having protrusions connected to the surface of the toner particle.

Washing and Drying Step

After the polymerization step was completed, the toner particle slurry was cooled, hydrochloric acid was added to the toner particle slurry to adjust the pH to 1.5 or less, and stirring was performed for 1 h, followed by solid-liquid separation using a pressure filter to obtain a toner cake. This was reslurried with ion-exchanged water to form a dispersion liquid again, and then solid-liquid separation was performed using the aforementioned filter. After repeating the reslurrying and solid-liquid separation until the electrical conductivity of the filtrate became 5.0 μS/cm or less, solid-liquid separation was finally performed to obtain a toner cake.

The obtained toner cake was dried using a pneumatic conveying dryer Flash Dryer (manufactured by Seishin Enterprise Co., Ltd.), and fine and coarse powders were cut using a multi-division classifier utilizing the Coanda effect to obtain toner B1. The drying conditions were a blowing temperature of 90° C. and a dryer outlet temperature of 40° C., and a supply rate of the toner cake was adjusted in accordance with the water content of the toner cake so that the outlet temperature did not deviate from 40° C. Table 1 shows the physical properties of the obtained toner B1.

Production Example of Toner B2

Toner B2 was obtained by the same method as in the production example of toner B1, except that in the polymerization step, volatile components were distilled off at normal pressure for 5 h while maintaining the temperature at 99° C., instead of distilling of the volatile components by reducing pressure for 3 h while maintaining the temperature at 85° C. Table 2 shows the physical properties of the obtained toner B2.

Production Example of Toner B3

Toner B3 was obtained by the same method as in the production example of toner B1, except that 20 parts of toluene was further added in the preparation step of polymerizable monomer composition. Table 2 shows the physical properties of the obtained toner B3.

Production Example of Toner B4

Toner B4 was obtained by the same method as in the production example of toner B1, except that 25 parts of toluene was further added in the preparation step of polymerizable monomer composition. Table 2 shows the physical properties of the obtained toner B4.

Production Example of Toner B5

Toner B5 was obtained by the same method as in the production example of toner B1, except that 30 parts of toluene was further added in the preparation step of polymerizable monomer composition. Table 2 shows the physical properties of the obtained toner B5.

Production Example of Toner B6

Toner B6 was obtained by the same method as in the production example of toner B1, except that 35 parts of toluene was further added in the preparation step of polymerizable monomer composition. Table 2 shows the physical properties of the obtained toner B6.

Production Example of Toner B7

Preparation Step of Aqueous Medium

A total of 7.0 parts of sodium phosphate (manufactured by Rasa Industries, Ltd., dodecahydrate) was added to 500.0 parts of ion-exchanged water in a reaction vessel and kept at 65° C. for 1.0 h while purging with nitrogen.

A calcium chloride aqueous solution prepared by dissolving 4.6 parts of calcium chloride (dihydrate) in 5.0 parts of ion-exchanged water was added all at once while stirring at 12,000 rpm by using T. K. Homomixer (manufactured by Tokushu Kika Kogyo Co., Ltd.), to prepare an aqueous medium comprising a dispersion stabilizer. Furthermore, 10% by mass hydrochloric acid was added to the aqueous medium to adjust the pH to 5.0 to obtain aqueous medium B7.

Hydrolysis Step of Organosilicon Compound for Surface Layer

A total of 60.0 parts of ion-exchanged water was weighed into a reaction vessel equipped with a stirrer and a thermometer, and the pH was adjusted to 3.0 using 10% by mass hydrochloric acid. This was heated with stirring until the temperature reached 25° C.

Thereafter, 40.0 parts of methyltriethoxysilane, which is an organosilicon compound for the surface layer, was added and hydrolyzed by stirring for 3 h or more. The end point of the hydrolysis was visually confirmed when the oil and water did not separate and became a single layer, and then cooling was performed to obtain a hydrolysate of the organosilicon compound for the surface layer.

Dispersion Step

A total of 120 parts of toner particles A6 were added to aqueous medium B7 and dispersed over 2 h while maintaining the temperature of the aqueous medium B7 at 50° C. and the rotation speed of T. K. Homomixer at 12,000 rpm.

Sphering Step

After the dispersion step, the stirrer was replaced with a propeller stirring blade, and the temperature was raised to 90° ° C. while stirring at 150 rpm to spheroidize the toner particles. When the desired SF-1 was reached, the temperature decrease was started, the temperature was reduced to 55° C., and when the pH was measured, the pH was 5.0. While stirring was continued at 55° C., 20.0 parts of the hydrolysate of the organosilicon compound for surface layer was added. After holding the slurry for 30 min as it was, the pH of the slurry was adjusted to 9.0 using an aqueous sodium hydroxide solution, and the slurry was held for an additional 300 min to form a surface layer having protrusions connected to the surface of the toner particle.

Washing and Drying Step

After the polymerization step was completed, the toner particle slurry was cooled, hydrochloric acid was added to the toner particle slurry to adjust the pH to 1.5 or less, and stirring was performed for 1 h, followed by solid-liquid separation using a pressure filter to obtain a toner cake. This was reslurried with ion-exchanged water to form a dispersion liquid again, and then solid-liquid separation was performed using the aforementioned filter. After repeating the reslurrying and solid-liquid separation until the electrical conductivity of the filtrate became 5.0 μS/cm or less, solid-liquid separation was finally performed to obtain a toner cake.

The obtained toner cake was dried using a pneumatic conveying dryer Flash Dryer (manufactured by Seishin Enterprise Co., Ltd.), and fine and coarse powders were cut using a multi-division classifier utilizing the Coanda effect to obtain toner B7. The drying conditions were a blowing temperature of 90° C. and a dryer outlet temperature of 40° C., and a supply rate of the toner cake was adjusted in accordance with the water content of the toner cake so that the outlet temperature did not deviate from 40° C. Table 2 shows the physical properties of the obtained toner B7.

TABLE 1

| Toner | Binder resin | SF-1 | External additive | Particle diameter (μm) | Connected protrusions comprising silicon |
|---|---|---|---|---|---|
| Toner A1 | Styrene acrylic resin | 130 | RY200 | 7.2 | None |
| Toner A2 | Styrene acrylic resin | 120 | RY200 | 7.2 | None |
| Toner A3 | Styrene acrylic resin | 125 | RY200 | 7.2 | None |
| Toner A4 | Styrene acrylic resin | 135 | RY200 | 7.2 | None |
| Toner A5 | Styrene acrylic resin | 140 | RY200 | 7.2 | None |
| Toner A6 | Styrene acrylic resin | 145 | RY200 | 7.2 | None |
| Toner A7 | Styrene acrylic resin | 130 | RY200<br>Hydrotalcite particles A7 | 7.2 | None |
| Toner A8 | Polyester resin | 130 | RY200<br>Needle-shaped titania particles | 7.2 | None |

TABLE 2

| Toner | Binder resin | SF-1 | Organosilicon compound for surface layer | Particle diameter (μm) | Connected protrusions comprising silicon |
|---|---|---|---|---|---|
| Toner B1 | Styrene acrylic resin | 110 | Methyltriethoxysilane | 6.7 | Yes |
| Toner B2 | Styrene acrylic resin | 105 | Methyltriethoxysilane | 6.7 | Yes |
| Toner B3 | Styrene acrylic resin | 115 | Methyltriethoxysilane | 6.7 | Yes |
| Toner B4 | Styrene acrylic resin | 120 | Methyltriethoxysilane | 6.7 | Yes |
| Toner B5 | Styrene acrylic resin | 125 | Methyltriethoxysilane | 6.7 | Yes |
| Toner B6 | Styrene acrylic resin | 130 | Methyltriethoxysilane | 6.7 | Yes |
| Toner B7 | Polyester resin | 110 | Methyltriethoxysilane | 6.7 | Yes |

In Tables 1 and 2, "Particle diameter" indicates the weight-average particle diameter (μm) of the toner. In the column "Connected protrusions comprising silicon", "None" indicates that there is no portion formed by connecting a plurality of protrusions comprising silicon on the surface of the toner particle, and "Yes" indicates that there is portion formed by connecting a plurality of protrusions comprising silicon on the surface of the toner particle.

Example 1

For the toner pack shown in FIGS. 2A and 2B, FIG. 3, and FIGS. 4A to 4D, the angle of the inclined surface **102*g*3 in FIG. 4C was adjusted to 50 degrees, toner A1 (71.8 g) was used as the first toner and toner B1 (3.6 g) was used as the second toner to fabricate the toner pack 1**, and the remaining amount of toner in the toner pack after replenishment was evaluated. The remaining amount of toner was 2.2 g. The results are shown in Table 3. It was determined that the remaining amount of toner of 2.0 g or less is particularly good, the amount of 4.0 g or less is preferable, and there is no practical problem if the amount is 5.0 g or less.

Examples 2 to 19

The same evaluation as in Example 1 was conducted by changing the angle of the inclined surface **102*g*3** of the toner pack and the type and amount of toner as shown in Table 3. The results are shown in Table 3.

Example 20

For the toner pack shown in FIGS. 2A and 2B, FIG. 3, and FIGS. 4A to 4D, the angle of the inclined surface **102*g*3 in FIG. 4C was adjusted to 50 degrees, toner A1 (71.8 g) was used as the first toner and toner B1 (3.6 g) was used as the second toner to fabricate the toner pack 20**, and the remaining amount of toner in the toner pack after replenishment was evaluated. The results are shown in Table 3.

Subsequently, a new toner pack 20 and toner pack 1 as a reference were fabricated. After the toner packs were allowed to stand in an environment of 40° C./95% RH (a harsh environment) for 30 days, the remaining amount of toner in the toner pack after toner replenishment was evaluated. The results are shown in Table 3.

The toner pack 20 had better results in maintaining the effect of reducing the remaining amount of toner in the toner pack after toner replenishment when stored in the harsh environment.

Comparative Example 1

The same evaluation as in Example 1 was conducted by changing the angle of the inclined surface **102*g*3** of the toner pack and the type and amount of toner as shown in Table 3. The results are shown in Table 3.

Comparative Example 2

The same evaluation as in Example 1 was conducted by changing the angle of the inclined surface **102*g*3** of the toner pack and the type and amount of toner as shown in Table 3. The results are shown in Table 3.

Subsequently, image evaluation was performed using the image forming apparatus 1 supplemented with the above-mentioned toner pack. In a high-temperature and high-humidity environment (temperature 33° C./humidity 85% RH), an image of a horizontal line with a print percentage of 1% was printed on 5000 sheets of LETTER size XEROX 4200 paper (manufactured by XEROX Corp., 75 g/$m^2$), and the reflectance (%) of the non-image area of the 5000-th image was measured using "REFLECTOMETER MODEL TC-6DS" (manufactured by Tokyo Denshoku Co., Ltd.).

Fogging was evaluated using the value (%) obtained by subtracting the obtained reflectance from the reflectance (%) of unused printout paper (standard paper) measured in the same manner. The smaller the value, the more suppressed image fogging is. In this evaluation, it was determined that fogging is preferably 2.0% or less, and that there is no practical problem if the fogging is 3.0% or less.

In an example using the toner of toner pack 22 (Comparative Example 2), the fogging was 4.6%. A similar evaluation was performed using toner pack 19 as a reference (Example 19), and the fogging was 1.5%.

Comparative Example 3

The same evaluation as in Example 1 was conducted by changing the angle of the inclined surface **102*g*3** of the toner pack and the type and amount of toner as shown in Table 3. The results are shown in Table 3.

In Table 3, "Content of second toner" indicates the content (% by number) of the second toner particles relative to the first toner particles in the toner pack.

Further, the "Remaining amount of toner" indicates the remaining amount (g) of toner in the toner pack after toner replenishment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-211262, filed Dec. 28, 2022, which is hereby incorporated by reference herein in its entirety.

What is claimed is:

1. A toner pack storing a toner, comprising:

a bag-shaped storage portion that stores the toner and has an opening;

a discharge member that is aligned with the storage portion in a first direction and is configured to discharge the toner from the storage portion, the first direction being a direction in which the opening opens;

the discharge member having a receiving port configured to receive the toner stored in the storage portion through the opening, and a discharge port that opens in a direction intersecting the first direction and is configured to discharge the toner received from the receiving port to outside of the toner pack;

the toner pack has a shielding member that shields the discharge port;

the receiving port being provided on a further toward inner side than the opening in a second direction perpendicular to the first direction, and opening toward the first direction;

TABLE 3

| | Toner pack | First Toner | Second toner | Content of second toner (% by number) | Angle of inclined surface 102g3 (degree) | Remaining amount of toner (g) | Remaining amount of toner (g) after storage in harsh environment | Fogging (%) |
|---|---|---|---|---|---|---|---|---|
| Example 1 | Toner pack 1 | Toner A1 | Toner B1 | 5.0 | 50 | 2.2 | 2.5 | — |
| Example 2 | Toner pack 2 | Toner A1 | Toner B1 | 5.0 | 45 | 2.1 | — | — |
| Example 3 | Toner pack 3 | Toner A1 | Toner B1 | 5.0 | 55 | 2.1 | — | — |
| Example 4 | Toner pack 4 | Toner A2 | Toner B1 | 5.0 | 50 | 2.2 | — | — |
| Example 5 | Toner pack 5 | Toner A3 | Toner B1 | 5.0 | 50 | 2.3 | — | — |
| Example 6 | Toner pack 6 | Toner A4 | Toner B1 | 5.0 | 50 | 2.2 | — | — |
| Example 7 | Toner pack 7 | Toner A5 | Toner B1 | 5.0 | 50 | 2.3 | — | — |
| Example 8 | Toner pack 8 | Toner A6 | Toner B1 | 5.0 | 50 | 2.4 | — | — |
| Example 9 | Toner pack 9 | Toner A1 | Toner B2 | 5.0 | 50 | 1.5 | — | — |
| Example 10 | Toner pack 10 | Toner A1 | Toner B3 | 5.0 | 50 | 2.1 | — | — |
| Example 11 | Toner pack 11 | Toner A1 | Toner B4 | 5.0 | 50 | 3.2 | — | — |
| Example 12 | Toner pack 12 | Toner A1 | Toner B5 | 5.0 | 50 | 3.3 | — | — |
| Example 13 | Toner pack 13 | Toner A1 | Toner B6 | 5.0 | 50 | 4.5 | — | — |
| Example 14 | Toner pack 14 | Toner A7 | Toner B1 | 5.0 | 50 | 1.7 | — | — |
| Example 15 | Toner pack 15 | Toner A8 | Toner B1 | 5.0 | 50 | 1.8 | — | — |
| Example 16 | Toner pack 16 | Toner A1 | Toner B1 | 0.10 | 50 | 2.6 | — | — |
| Example 17 | Toner pack 17 | Toner A1 | Toner B1 | 10 | 50 | 2.2 | — | — |
| Example 18 | Toner pack 18 | Toner A1 | Toner B1 | 15 | 50 | 2.1 | — | — |
| Example 19 | Toner pack 19 | Toner A1 | Toner B1 | 20 | 50 | 2.0 | — | 1.5 |
| Example 20 | Toner pack 20 | Toner A1 | Toner B7 | 5.0 | 50 | 2.3 | 4.3 | — |
| Comparative Example 1 | Toner pack 21 | Toner A1 | — | 0 | 50 | 6.3 | — | — |
| Comparative Example 2 | Toner pack 22 | Toner A1 | Toner B1 | 30 | 50 | 2.1 | — | 4.2 |
| Comparative Example 3 | Toner pack 23 | Toner A1 | Toner B1 | 0.050 | 50 | 5.8 | — | — |

the discharge member having a fixing part to which the opening of the storage portion is fixed, a surface extending in a direction intersecting the first direction between an outer circumferential surface of the fixing part and the receiving port, and at least one inclined surface configured to move the received toner toward the discharge port, where adjacent inclined surfaces have different inclination angles; and the inclined surface that is closest to the storage portion in the first direction is at an angle of 45 degrees or more and less than 90 degrees with respect to the first direction, wherein the toner comprises a first toner and a second toner, the first toner comprises a first toner particle having silica fine particle externally added to a surface of the first toner particle, the second toner comprises a second toner particle having a surface with a portion formed by connecting a plurality of protrusions comprising silicon, a surface of the first toner particle having no portion formed by connecting a plurality of protrusions comprising silicon, and a content of the second toner particle relative to the first toner particle in the toner pack being 0.10 to 20% by number.

2. The toner pack according to claim 1, wherein the first toner comprises fluorine-comprising hydrotalcite particles externally added to the surface of the first toner particle.

3. The toner pack according to claim 2, wherein a content of the fluorine-comprising hydrotalcite particles is 0.01 to 0.5 parts by mass based on 100 parts by mass of toner particles.

4. The toner pack according to claim 1, wherein the first toner comprises needle-shaped titania particles externally added to the surface of the first toner particle.

5. The toner pack according to claim 4, wherein a content of the needle-shaped titania particles is 0.01 to 0.5 parts by mass based on 100 parts by mass of toner particles.

6. The toner pack according to claim 1, wherein the first toner has a shape factor SF-1 of 110 to 150.

7. The toner pack according to claim 1, wherein the second toner has a shape factor SF-1 of 100 to 140.

8. The toner pack according to claim 1, wherein the second toner particle comprises a styrene acrylic resin as a binder resin.

9. The toner pack according to claim 1, wherein the discharge member has three inclined surfaces having different inclination angles.

* * * * *